US008965796B1

(12) United States Patent
Gala

(10) Patent No.: US 8,965,796 B1
(45) Date of Patent: Feb. 24, 2015

(54) SYSTEMS, METHODS, AND DEVICES FOR TRACKING AND ESTIMATING INVENTORY

(71) Applicant: Mitesh Gala, Santa Ana, CA (US)

(72) Inventor: Mitesh Gala, Santa Ana, CA (US)

( * ) Notice: Subject to any disclaimer, the term of this patent is extended or adjusted under 35 U.S.C. 154(b) by 0 days.

(21) Appl. No.: 14/257,819

(22) Filed: Apr. 21, 2014

(51) Int. Cl.
*G06Q 30/00* (2012.01)
*G06G 1/14* (2006.01)
*G06Q 20/00* (2012.01)

(52) U.S. Cl.
USPC .......................................................... 705/28

(58) Field of Classification Search
CPC ........................... G06Q 10/087; G06Q 20/203
USPC ..................................................... 705/28, 22
See application file for complete search history.

(56) References Cited

U.S. PATENT DOCUMENTS

| | | | |
|---|---|---|---|
| 7,908,184 B2 * | 3/2011 | Choe .............................. | 705/26.7 |
| 8,041,441 B2 * | 10/2011 | Izumi et al. ................... | 700/101 |
| 8,321,302 B2 * | 11/2012 | Bauer et al. ..................... | 705/28 |
| 8,346,630 B1 * | 1/2013 | McKeown ....................... | 705/28 |
| 2002/0108117 A1 * | 8/2002 | Sedlak et al. ................... | 725/87 |
| 2003/0216969 A1 * | 11/2003 | Bauer et al. ..................... | 705/22 |
| 2007/0129953 A1 * | 6/2007 | Cunningham et al. ............ | 705/1 |
| 2008/0120200 A1 * | 5/2008 | Hurtis et al. .................... | 705/28 |
| 2008/0243646 A1 * | 10/2008 | Stein et al. ...................... | 705/28 |
| 2008/0275584 A1 * | 11/2008 | Izumi et al. .................... | 700/101 |
| 2010/0138281 A1 * | 6/2010 | Zhang et al. .................... | 705/10 |

* cited by examiner

*Primary Examiner* — Seye Iwarere
(74) *Attorney, Agent, or Firm* — Knobbe Martens Olson & Bear LLP

(57) ABSTRACT

The disclosure herein provides system, methods, and devices for tracking and estimating inventory. A real-time inventory system for tracking and estimating inventory of a plurality of items comprises an electronic items database configured to store data relating to the plurality of items; an electronic inventory database configured to store inventory count data; a counting interface configured to receive current count data from a user access point system; a variance calculator configured to access the estimated current quantity to determine a first variance; a prioritization engine configured to analyze the first variance and to increase the first count frequency such that the first item will be counted more frequently than at least one other item.

6 Claims, 13 Drawing Sheets

Figure 4

| Item _402_ | Projected Real-time Inventory (ea.) _404_ | Last Actual Count (ea.) _406_ | Days Since Last Count _408_ | Latest Variance (%) _410_ | Latest Variance ($) _412_ | Scheduled Count Frequency _414_ |
|---|---|---|---|---|---|---|
| Hamburger patties | 1,222 | 1,548 | 1 | 20 % | $500 | Daily |
| Cheese | 852 | 905 | 0 | 15% | $275 | Daily |
| French fries | 5,457 | 4,582 | 5 | 8% | $75 | Weekly |
| Pickles | 523 | 605 | 3 | 7.5% | $53 | Weekly |
| Napkins | 2,470 | 2,840 | 25 | 12% | $12 | Monthly |
| Ketchup packets | 783 | 1,200 | 15 | 5% | $10 | Monthly |
| Dishwashing soap | 15 | 16 | 45 | 0% | $0 | Bi-monthly |

420, 422, 424, 426

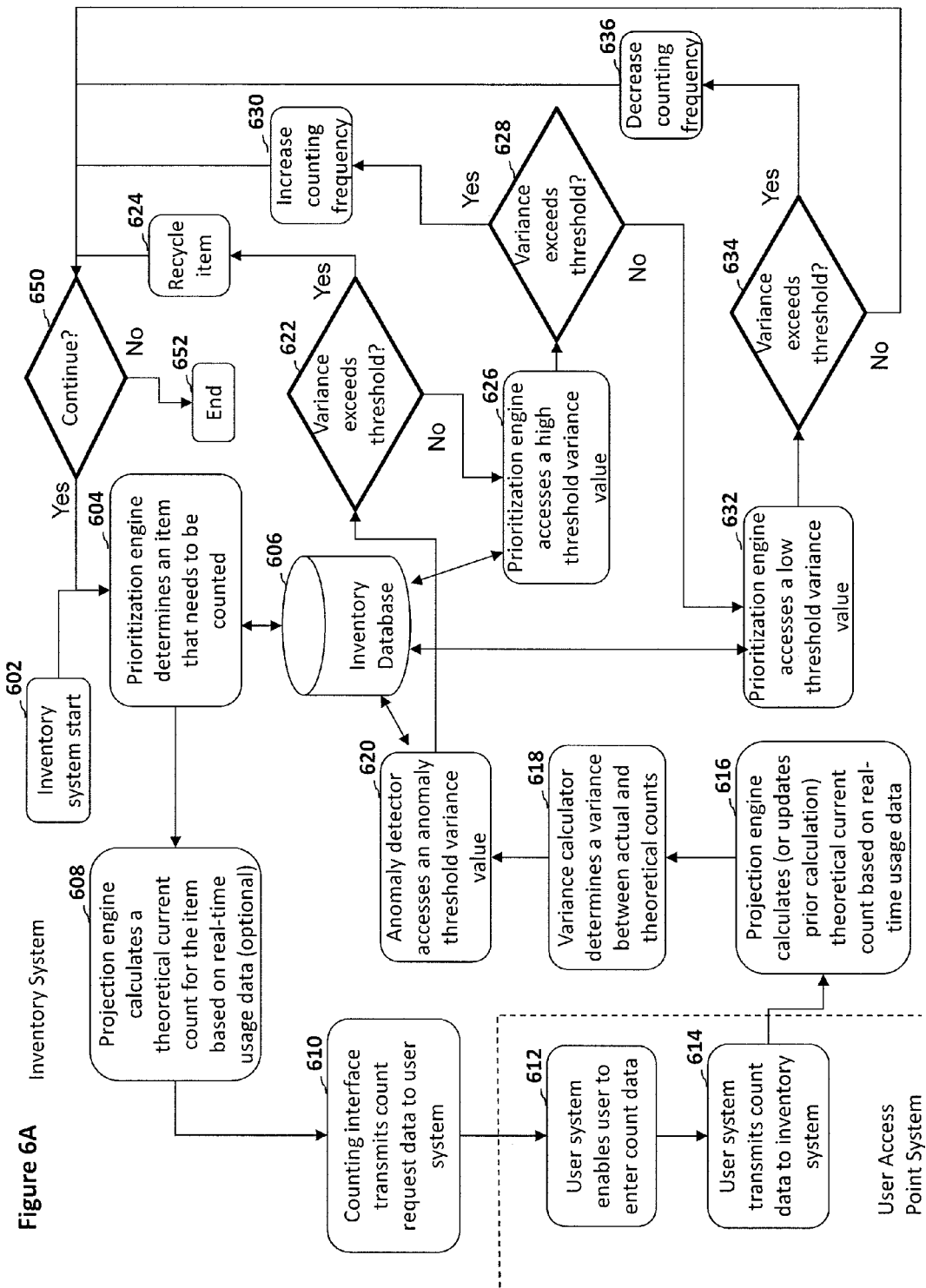
Figure 6A    Inventory System

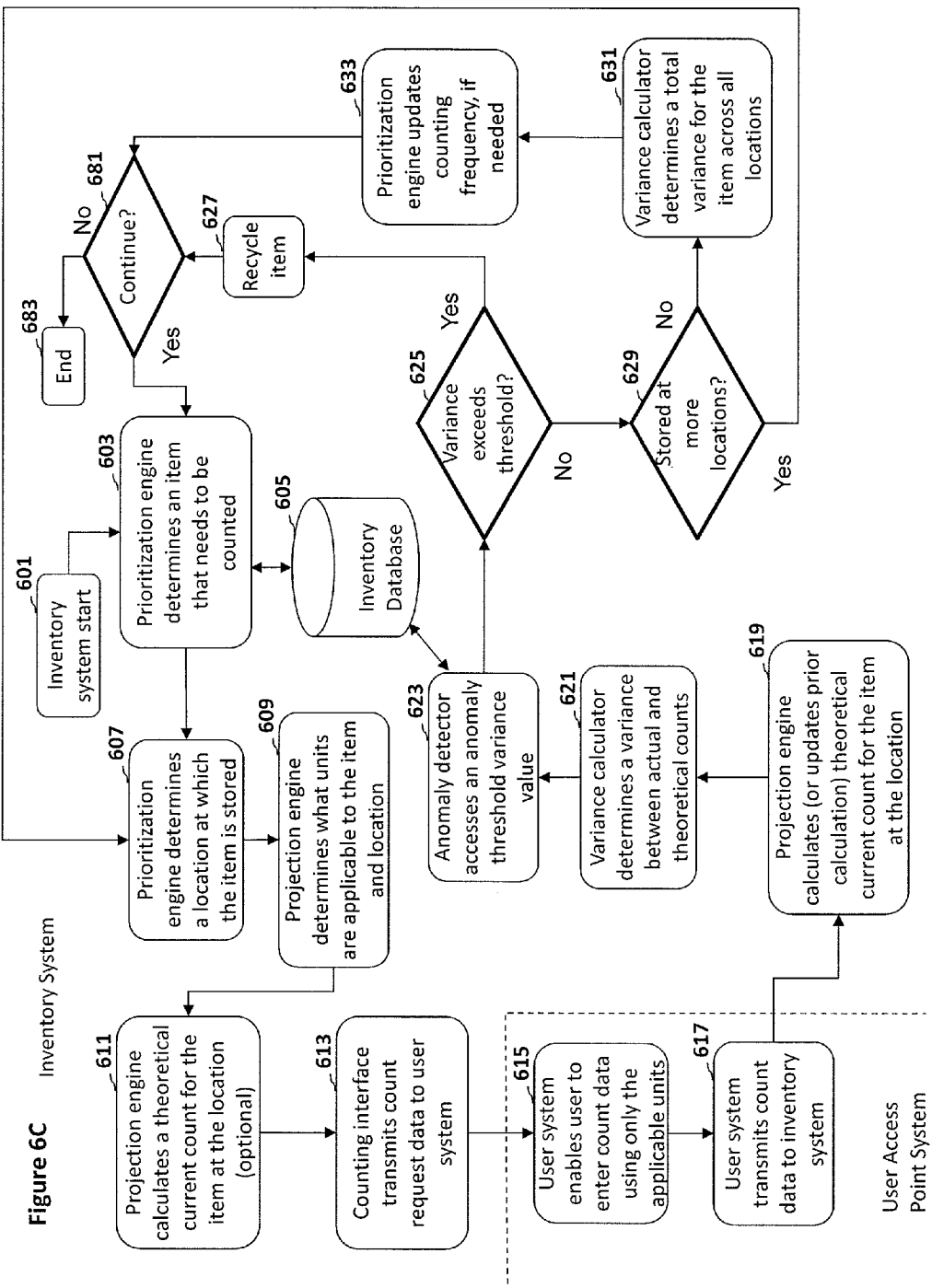
Figure 6C  Inventory System

SYSTEMS, METHODS, AND DEVICES FOR TRACKING AND ESTIMATING INVENTORY

BACKGROUND

1. Field

The disclosure relates generally to the field of inventory management, and more specifically to systems, methods, and devices for tracking and estimating inventory of a plurality of items.

2. Description

Tracking of inventory is a requirement for many types of businesses. For example, a restaurant needs to know what and how many food items it has in stock so that it can ensure it has enough inventory to handle anticipated orders. Further, the business needs to know when inventory levels of various items have dropped to a certain level, requiring reordering. In other examples, manufacturing facilities need to know what and how many raw material items are in stock so that the manufacturing facilities can ensure there are enough raw material inventory to handle anticipated orders or actual orders. In yet another example, warehouses and/or retail stores need to know what and how many product items are in stock so that the warehouses and/or retail stores can ensure there are enough products in inventory available to handle anticipated orders or actual orders.

Generally, a business that operates using inventory must periodically physically count everything in inventory to reconcile their systems. For example, some product may be lost or wasted during production and/or stolen, leading to inaccuracies in what the inventory system says is in inventory versus what is actually in inventory. Accordingly, a business will periodically physically count everything in inventory. For example, in a restaurant business, the business may do a weekly inventory whereby every single item in inventory is counted once a week and the businesses inventory system is updated based on the actual count.

Physical inventories present various problems. For one, counting all items in inventory takes a significant amount of time. This is time that the business will need to pay its employees for that is not productive time, meaning sales are not being generated by the time spent conducting a physical inventory. Further, as physical inventories are typically conducted by employees, human error can be introduced, such as when an employee does not count goods accurately, forgets to count some items, and/or enters his or her count incorrectly into the inventory system. Accordingly, it can be advantageous to have systems, methods, and devices that enable robust and efficient tracking and estimation of inventory.

SUMMARY

The disclosure herein presents systems, methods, and devices for robust and efficient tracking and estimating of inventory. In one embodiment, a system can be configured to enable users to efficiently count items that are stored in a plurality of storage locations and to automatically cause items with higher variance to be counted more frequently and items with lower variance to be counted less frequently. Such a system can enable a business to conduct an ongoing inventory wherein only a subset of the business' items are counted at any one time, leading to a more efficient inventory that takes less time than a full physical inventory and is more accurate.

In some embodiments, a real-time inventory system for tracking and estimating inventory of a plurality of items comprises an electronic items database configured to store data relating to the plurality of items, the data comprising a first count frequency associated with a first item, the first count frequency defining a frequency at which the first item is to be counted; an electronic inventory database configured to store inventory count data, the inventory count data comprising an estimated current quantity of the first item; a counting interface configured to receive current count data from a user access point system through a computer network, the current count data indicating a current actual quantity of the first item; a variance calculator configured to access the estimated current quantity to determine a first variance based on comparing the current count data to the estimated current quantity of the first item; a prioritization engine configured to analyze the first variance and to, automatically based on determining the first variance exceeds a threshold value, increase the first count frequency such that the first item will be counted more frequently than at least one other item; and one or more computers configured to operate the counting interface, variance calculator, and prioritization engine, wherein the one or more computers comprises a computer processor and an electronic storage medium.

In certain embodiments, a real-time inventory system for robust tracking of inventory of a plurality of items comprises an electronic inventory database configured to store data relating to the plurality of items, the data comprising at least a first count frequency associated with a first item, a plurality of storage locations at which the first item may be stored, an estimated quantity of the first item currently stored in each of the plurality of storage locations, and at least one applicable unit of storage for each of the plurality of storage locations; a prioritization engine configured to analyze the first count frequency and a last count time for the first item to determine that the first item should be counted; a counting interface configured to electronically communicate with a user access point system through a computer network to transmit counting instruction data and to receive current count data, the counting instruction data configured to cause the user access point system to enable inputting of count data in only the at least one applicable unit of storage for each of the plurality of storage locations, the current count data indicating a current actual quantity of the first item in a first storage location; a variance calculator configured to access the estimated quantity of the first item currently stored in the first storage location, and to determine a variance based on comparing the current count data to the estimated quantity; an error detector configured to analyze the variance and to, automatically based on determining the variance exceeds a threshold value, transmit data to the user access point system to cause the first item to be recounted; and one or more computers configured to operate the prioritization engine, counting interface, variance calculator, and error detector, wherein the one or more computers comprises a computer processor and an electronic storage medium.

In some embodiments, an inventory counting system for robust tracking of an inventory of a plurality of items comprises a touch-sensitive display interface configured to display inventory data and to receive user inputs; a count data interface configured to electronically communicate with an inventory system through a computer network to receive counting instruction data and to transmit current count data, the counting instruction data comprising a first item to be counted, at least one applicable unit of storage for the first item, and an estimated current quantity of the first item, the current count data indicating a current actual quantity of the first item, wherein the display interface is configured to enable the user to input count data using only the at least one applicable unit of storage, and to generate the current count data based on the count data inputted by the user, wherein the display interface is further configured to determine an estimated quantity remaining to be counted by comparing the estimated current quantity of the first item to the current count data, and to indicate, using a pictorial indicator, whether the estimated quantity remaining to be counted is within a threshold value; and one or more computers configured to operate the display interface and the count data interface, wherein the one or more computers comprises a computer processor and an electronic storage medium.

BRIEF DESCRIPTION OF THE DRAWINGS

The foregoing and other features, aspects, and advantages of the present invention are described in detail below with reference to the drawings of various embodiments, which are intended to illustrate and not to limit the invention. The drawings comprise the following figures in which:

FIG. 4 is a table illustrating an example of data stored in an embodiment of an inventory system database.

FIG. 6A depicts an embodiment of a process flow diagram illustrating an example of automatically adjusting item count frequencies.

FIG. 6C depicts an embodiment of a process flow diagram illustrating an example of counting items stored in a plurality of locations.

DETAILED DESCRIPTION OF THE EMBODIMENTS

Figure 1:
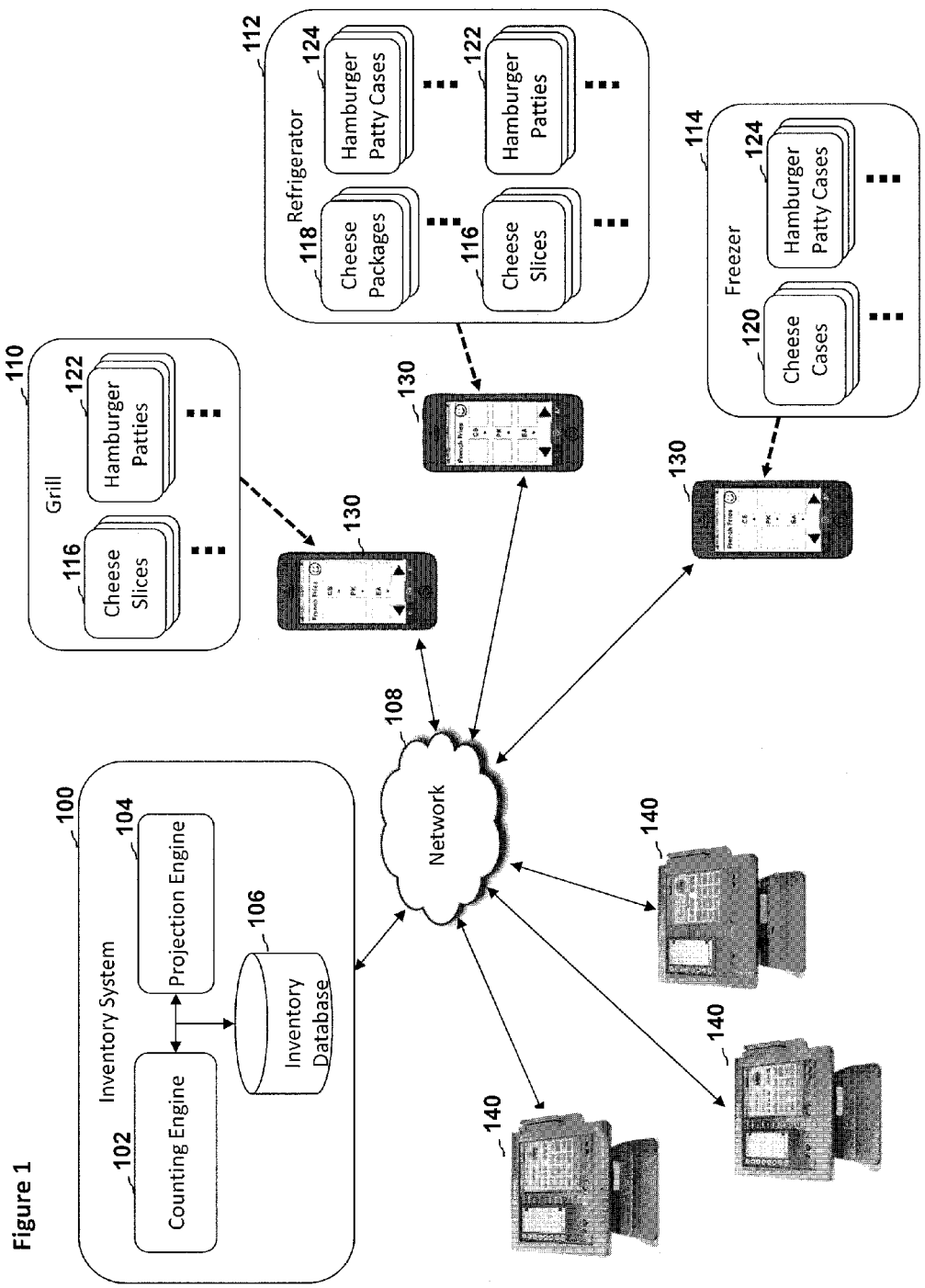
FIG. 1 is an embodiment of a schematic diagram illustrating an inventory system in communication with a plurality of other systems.

Although several embodiments, examples, and illustrations are disclosed below, it will be understood by those of ordinary skill in the art that the invention described herein extends beyond the specifically disclosed embodiments, examples, and illustrations and includes other uses of the invention and obvious modifications and equivalents thereof. Embodiments of the invention are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention. In addition, embodiments of the invention can comprise several novel features and no single feature is solely responsible for its desirable attributes or is essential to practicing the inventions herein described. Further, it should be understood that any of the examples herein are non-limiting. As such, the inventions disclosed herein are not limited to any particular embodiments, aspects, concepts, structures, functionalities, or examples described herein.

The disclosure herein presents systems, methods, and devices for robust and efficient tracking and estimation of inventory. In one embodiment, the system can be configured to enable a user to easily and efficiently count items stored across a plurality of storage locations, while ensuring accuracy of the counts. Further, in some embodiments, the system can be configured to automatically increase or decrease the frequency at which an item is counted based on, for example, a variance between a projected theoretical amount of inventory and the actual count. Systems as disclosed herein can take a long, tedious, and laborious physical inventory process and turn it into an efficient, accurate, and fun to use real-time inventory tracking system.

Many businesses require inventory to operate. For example, a restaurant business requires an inventory of food products, in addition to various other items such as cleaning supplies, napkins, silverware, cups, and/or the like. Many other types of businesses also require maintaining and tracking of inventory. For example, a grocery store, an online retailer, a department store, and a car dealership all require at least some sort of inventory tracking system. Further, any business that utilizes an inventory should periodically verify its inventory numbers to reconcile any unexpected loss. For example, in the restaurant business, a recipe may call for 16 ounces of ground beef. However, each time that recipe is utilized, there may be some loss. For example, 16 ounces of ground beef may go into the recipe and 1 ounce of ground beef may be wasted during the process. Further, inventory loss can occur through food spoilage, theft, and/or various other types of waste or loss.

Typically, a business that has to perform an inventory will perform a complete inventory of all items in inventory on a periodic basis. In many cases, the business is required to be shut down, meaning it is not serving its customers while this physical inventory is occurring. For example, a restaurant may have 100 items in their inventory. These items may be, for example, hamburger patties, French fries, cheese slices, dish soap, napkins, and/or the like. Often in the restaurant business, the physical inventory occurs weekly. Accordingly, all 100 of these items need to be counted on a weekly basis during a normal physical inventory process. Such a physical inventory process is disruptive to business, costs a significant amount of money in, among other things, unproductive employee time, and often causes employees to be required to work during non-normal business hours.

The systems, methods, and devices disclosed herein disclose systems for taking inventory that have several advantages over existing inventory processes. For example, in some embodiments, a physical inventory can be divided into chunks, or discreet time periods, that occur over an extended period of time. For example, if a restaurant has 100 items and typically performs a weekly total inventory, a system as described herein may be configured to enable the business to inventory 20 of the items five times a week on each weekday of that week. This can be more efficient, because, among other things, each discreet time at which inventory is performed is a much shorter period of time. A typical physical inventory process would be difficult to split into chunks or discrete period of times like this, because, among other things, a typical physical inventory process is not able to be performed while the business is still operating and selling items out of the inventory. The systems, methods, and devices disclosed herein, however, can be configured to conduct inventory counts without disrupting business, because, among other things, the system can be configured to dynamically update its current estimated inventory levels in real time during the inventory in response to customer orders and/or supplier deliveries.

Systems, methods, and devices as disclosed herein can further make the inventory process more efficient by not just breaking a total inventory into chunks or discrete periods of time, but also counting different items on different frequencies. For example, a typical business may count all 100 items once every week. However, systems as disclosed herein can be configured to dynamically determine which items should be counted with greater frequency, and configured to automatically instruct employees to count more important items and/or items that have a greater variance more often than items that are less important and/or that typically have a lower variance. For example, hamburger patties may be a restaurant's most expensive item, and accordingly a relatively small unit variance results in a relatively high dollar variance. On the other hand, napkins may be one of the cheapest items in the restaurant, and even a high unit variance may result in a relatively small dollar variance. Accordingly, a system as described herein can be configured to cause the hamburger patties, or other high unit price items, to be counted at a higher frequency than the napkins, or other low unit price items. For example, the hamburger patties may be counted daily or weekly, while the napkins are counted only monthly.

It would be difficult or impossible to separate a full physical inventory into discrete time periods and to count some items at different frequencies using a typical physical inventory process. However, the processes disclosed herein enable this functionality by, among other things, enabling an inventory system to project or estimate in real time what the current estimated inventory level is for any specific item, even if it has been a relatively long time since that item has been physically counted. One way systems as disclosed herein accomplish this is by receiving data in real time from one or more order processing systems to track in real time sales, deliveries, or other events that may cause a change in quantity of the inventory items. In some embodiments, the system can be configured to calculate a theoretical count of inventory items based on this real-time sales data. For example, the system can be configured to start with the last physical count value, subtract off any known usage or estimated usage based on the real-time sales data, and/or subtract off any expected waste of the product, and/or subtract off any expected theft of the product, and/or subtract off any additional expected loss of the product, with the result being a projected theoretical current count. By using such a real-time estimation, this can enable a system to estimate the current inventory level of all items in an inventory without requiring frequent physical counting of the entire inventory. In an embodiment, the projected theoretical current count can be used as a cross check of the actual physical inventory count generated by employees. If the variance between the projected theoretical current count and the actual physical inventory count is above a predetermined threshold level, then the system can be configured to dynamically generate an alert message to a supervisor or the system can be configured to dynamically instruct the employee to conduct a recount. In an embodiment, the system can be configured to dynamically determine what item the employee should recount, wherein the determination is based on historical data, such as items that have historically been miscounted. In an embodiment, the system can be configured to generate a reminder message for the employee to check specific locations within a facility for missing inventory items, wherein the reminder message is based on historical data indicating that prior inventory counts have missed inventory in specific locations of a facility.

In some embodiments, a waste or loss factor can be a factor applied to a unit number of sales or actual usage. For example, a recipe may call for 8 ounces of sugar. However, by analyzing historical use, the system may be able to automatically determine that 8.5 ounces of sugar is typically actually used in this recipe, with the extra 0.5 ounces of sugar likely being waste. Accordingly, the system can be configured to apply a factor that estimates an additional 0.5 ounces of sugar is lost every time this recipe is used. In some embodiments, a waste factor can be based on something other than actual usage. For example, by analyzing historical data, the system can be configured to determine that 16 ounces of sugar is wasted on average per day. Accordingly, a waste factor can be introduced that assumes the business loses 16 ounces of sugar each day the businesses is in operation. As another example, a hamburger business may determine that on average it loses 1 pound of ground beef per day. Accordingly, when the system is configured to project a real-time current inventory level, the system can be configured to take into account a projected loss of 1 pound of ground beef per day.

In some embodiments, a loss factor or waste factor can be at least partially dependent on a location at which an item is stored. For example, a loss factor or waste factor may be increased for items that are stored in a more perishable storage location. For example, more loss may occur to an item stored in a refrigerator versus being stored in a freezer. Accordingly, the loss factor may be higher for an item stored in the refrigerator versus the loss factor for that same item stored in the freezer. Accordingly, more than one different loss factor or waste factor may apply to a single item.

In some embodiments, the system can be configured to cause a certain percentage of items to be counted each time items are to be counted, such as each day. For example, the system can be configured to cause 20% of all items to be counted each day an inventory count is to be performed. In some embodiments, at least some of the items being counted at any one time are randomly selected by the system. In some embodiments, at least some of the items being counted at any one time are selected based on a count frequency defined at least in part by a past variance of that item.

In some embodiments, an inventory system is configured to perform a total inventory of all items in an inventory over an extended period of time or spread across a plurality of discrete periods of time. One way systems as disclosed herein enable this functionality is by being able to project or estimate in real time a current inventory level of each item.

In some embodiments, actual usage is defined by an opening inventory plus deliveries minus a closing inventory. For example, if an opening inventory, meaning the last physical inventory count, shows that there are 100 hamburger patties, and before the next physical count 100 more hamburger patties are delivered, the actual use of hamburger patties will be 200 minus a new physical inventory count. For instance, if a new physical inventory counts shows that 50 hamburger patties are in inventory, then actual use of hamburger patties was 150 hamburger patties.

In some embodiments, once actual use is determined, a variance can be calculated. Variance is the actual use minus a theoretical or ideal use. The theoretical or ideal use is in some embodiments, such as for food items, based on a recipe. For example, if a restaurant sells one hamburger, it should have theoretically used one hamburger patty. In the example given above, if 140 hamburgers were sold, then the variance is 10 units, because the actual usage was 150 hamburger patties. Inventory systems, methods, and devices as disclosed herein can utilize variance in various units. For example, a system can utilize the raw unit variance, such as 10 hamburger patties. In some embodiments, the system can be configured to utilize variance as a percentage variance or dollar value variance. For example, a variance of 10 hamburger patties when 140 hamburger patties were supposed to be used would result in a percentage variance of approximately 7.1%. If each hamburger patty has a cost of $0.25, then a variance of 10 hamburger patties results in a dollar variance of $2.50.

The calculated variance can be used for multiple things. For example, as further described below, the variance can in some embodiments be used to adjust a frequency of counting for an item. For example, if an item has a high variance, the system may automatically increase the frequency with which that item is counted. In some embodiments, the variance can be used to assist the system in automatically determining a waste factor. For example, if the system determines that on average a variance is 7%, then the system may be configured to apply a waste factor of 7% in making its real-time inventory projections. For example, if hamburger patties have not been counted in two weeks, and 100 hamburgers have been sold in those two weeks, then a projected current inventory would be the last physical inventory count plus any deliveries, minus 100 theoretical usage, minus 7 estimated waste usage. Accordingly, if the last physical inventory two weeks ago determined there are 200 hamburger patties in stock, and no deliveries have been made in the last two weeks, then the projected current inventory level would be 93.

One advantage of the systems, methods, and devices disclosed herein is that a business can focus on the items that are most important. For example, if the inventory system enables users to count items, and when the users are counting bacon they get a large variance, the system can be configured to automatically drop the counting frequency or interval to weekly from monthly. And if the system continues to get a big variance on bacon, the system can be configured to automatically increase the frequency to daily. In this way, the business is only counting the items that are most valuable and need to be counted. The business is not wasting its time counting cheaper things with lower variances, such as, for example, napkins, straws, ketchup packets, and/or the like, that do not matter nearly as much as a more expensive product like bacon that may have a higher variance. Accordingly, these other items may be counted on a monthly or even longer frequency. In an embodiment, the system can dynamically determine and/or link high variances to particular factors, for example, time of day, day of month, month of year, personnel or staff on duty or suppliers during the period the variance was detected. For example, by linking high variance levels to particular personnel or staff, the system can help enable supervisors identify problematic employees or underperforming employees. As another example, by linking high variance levels to particular suppliers, the system can help enable supervisors identify possible problematic suppliers that are providing poor quality food inventory items that employees cannot use and must throw away. In some embodiments, the system can be configured to electronically communicate with an employee time clock, time tracking, and/or resource scheduling system to dynamically determine what personnel or staff are on duty at specific times. In some embodiments, these functions can be performed at least in part by the scheduling interface 554 shown in FIG. 5B.

It can be seen that such a system can be highly beneficial to businesses such as restaurants which in the industry today typically physically count everything in their inventory every week. Accordingly, the systems, methods, and devices disclosed herein can cut down on the amount of counting and cut down on the associated labor costs involved with all of the counting. Further, the concepts disclosed herein can reduce the number of items that have to be counted, the amount of time it takes to count those items, both in aggregate as well as on a specific date.

As will be described in further detail below, the systems, methods, and devices as disclosed herein further make it easier for a user to enter a count and harder for the user to make an error in entering the count. For example, as further described below, a system can be configured to only enable a user to enter counts in units that are applicable to the current item and/or storage location. For example, hamburger patties stored in the freezer may only be stored in cases. Accordingly, a user access point system that enables a user to enter a count may enable the user to only enter a count based on case units. Further, the system may be configured to enable the user to very easily enter counts, such as by simply tapping on a box on a touchscreen device, entering a count via voice commands, etc. Enabling a user to enter a count quickly and correctly can be highly advantageous. As one example, if a user is counting in a freezer, the user likely wants to spend as little amount of time as possible in the freezer, because the freezer is uncomfortably cold. Accordingly, systems, methods, and devices as disclosed herein enable the user to perform the inventory in the freezer faster and less frequently than with total typical physical inventory methods.

In some embodiments, a system is configured to incorporate a reasonability tolerance that is configured to enable the system to automatically determine when a mistake, error, or anomaly is likely to have occurred. For example, if a user is counting bacon and the system expects there to be two cases of bacon, yet the user enters 222 cases by accident, the system can be configured to automatically determine that 222 cases is outside of the reasonability tolerance and that there is likely an error or anomaly in the system. The system can be configured to then recycle, recirculate, or double check that item, meaning it will request that the user recount the item. In some embodiments, the system can be configured to explicitly request that the user recount the item. In other embodiments, the system can be configured to simply put that item back into a list of items that need to be counted so that it will come up again on the user access point system as an item that needs to be counted. In such an embodiment, the system may not explicitly tell the user that there was an error, but may just request that the item be counted again.

In some embodiments, a system can be configured to indicate to a user how many items are expected to be remaining to be counted. For example, if a user is counting cheese, the system may be configured to project that there should be 200 slices of cheese in the system. Accordingly, a user access point system the user is using to count the cheese can be configured to display a countdown indicator that begins at the number 200 and decrements every time the user enters a slice of cheese. Accordingly, if the user has counted 100 slices of cheese, the countdown indicator will indicate 100 slices are remaining to be counted. This can be advantageous to, among other things, enable a user to know the number of items or at least the order of magnitude of number of items he or she is searching for. This can be helpful in, for example, a crowded or cluttered freezer where it may sometimes be difficult to find items. A countdown indicator can also be useful to give a user immediate feedback and to help reduce human error.

In some embodiments, the user access point system can be configured to utilize a pictorial graphic indicator that, among other things, displays to the user how close the user is to the expected count. For example, if the user has counted 100 slices of cheese and 100 slices of cheese are expected to be remaining, the indicator may be an emoticon showing, for example, a sad face. However, when the user is closer to the count, such as when the user has counted the full 200 slices that were expected to be in inventory, the emoticon may change to a happy face. In various embodiments, the emoticon or pictorial indicator may be configured to change states at various levels. For example, the indicator may change states when the user has met exactly the expected count, when the user has counted items to within 5% of the expected count, within 10% of the expected count, and/or the like. In some embodiments, the pictorial indicator can be, for example, an indicator having a plurality of states that indicate, for example, a percentage of the count that has been performed. For example, the indicator may be an unshaded bar that progressively shades in from left to right as the count progresses. In another embodiment, the pictorial indicator may be a circular indicator that progressively fills in clockwise fashion from 0% to 100% as the user performs the count. A pictorial indicator can be useful to enable the user to know how he or she is progressing. Further, a pictorial indicator such as a sad face emoticon can have an incredible effect on people. People often will not let something like a sad face emoticon remain. Accordingly, such a pictorial indicator can encourage the user to continue the inventory until the pictorial indicator has changed to the happy face.

In some embodiments, an inventory system as disclosed herein can be configured to operate a running or ongoing inventory that is never fully complete in the sense that the system is not configured to ever have all items physically counted during the same discrete time period. In other embodiments, the system is configured to complete a full physical inventory, but to spread that full physical inventory over a plurality of discrete time periods.

Restaurant Inventory System

FIG. 1 is an embodiment of a schematic diagram illustrating an example of a restaurant inventory system 100 in communication with various other systems. Although this example is described with respect to a restaurant, similar embodiments may be utilized for various other inventory needs. In this embodiment, the inventory system 100 is configured to communicate through an electronic network 108 with a plurality of order processing systems 140 and user access point systems 130. For example, such an inventory system 100 may be utilized in a fast food restaurant, wherein each of the order processing systems 140 is a point of sale system utilized to take customer food orders. The user access point systems 130 can be configured to enable an employee of the business to count inventory at various storage locations using, for example, a portable electronic device such as a smartphone, tablet computer, and/or the like. The user access point systems 130 can be configured to communicate with the inventory system 100 through the network 108 to provide count data to the inventory system 100 and to receive instructions and other data from the inventory system 100. The order processing systems 140 can be configured to communicate through the network 108 with the inventory system 100 to, for example, send data to the inventory system 100 indicating when inventory items are sold such that the inventory system 100 can update its projections as to a current real-time inventory level for each of a plurality of items.

The inventory system 100 illustrated at FIG. 1 comprises a counting engine 102, a projection engine 104, and an inventory database 106. The counting engine 102 can be configured to communicate with the various user access point systems 130 to indicate to the user access point system what needs to be counted, where the item to be counted is located, and various other information as further described below. The counting engine 102 can further be configured to receive count data from the user access point systems 130 indicating a physical count of an item at each storage location.

The projection engine 104 can be configured to estimate or project a real-time inventory of a plurality of items in the business' inventory. For example, the projection engine 104 can be configured to start with the actual physical inventory count from the last time an item was physically counted and to then factor in any actual sales as reported by the order processing systems 140 and any projected loss, such as through waste or theft. Accordingly, the projection engine 104 can be configured to always have available a real-time estimate or projection of the current inventory level of each item in a business' inventory, even if some or all of the items have not been physically counted recently.

The inventory database 106 can be configured to store various types of information, such as a list of all of the items in a business' inventory, the frequency with which each item is intended to be counted, the current projected number of items in inventory for each item, the last physical inventory count for each item, one or more variance amounts comparing a physical count to a projected theoretical amount, and/or the like. An example of some of the types of information that can be stored in the inventory database 106 can be seen in FIG. 4, which is described in more detail below.

FIG. 1 illustrates the concept that a business can have items stored at a plurality of storage locations and stored using a plurality of storage units. For instance, in a fast food restaurant that sells hamburgers and cheeseburgers, the restaurant will need to keep an inventory of at least hamburger or hamburger patties and cheese. However, hamburger can be stored in various ways, such as individual patties, bulk ground beef, individual patties stored in a case in a freezer, individual patties stored by themselves in a refrigerator and/or at the grill, and/or the like. Further, cheese can be stored in individual slices, packages of individual slices, cases of packages, and/or the like.

FIG. 1 illustrates that the business in this example comprises three different storage locations, namely a grill 110, a refrigerator 112, and a freezer 114. In this embodiment, cheese is stored as individual cheese slices 116 at the grill 110 and the refrigerator 112. Further, cheese packages 118 are stored only at the refrigerator 112. Finally, cases of cheese 120 are only stored at the freezer 114. Regarding hamburger patties, individual hamburger patties 122 can be stored at the grill 110 and the refrigerator 112. Further, cases of hamburger patties can be stored at the refrigerator 112 and the freezer 114.

One way that inaccuracies or errors can be introduced into an inventory or a physical inventory count is that items can be stored using different storage units and a user or employee may enter their count using the wrong unit. For example, if an employee is counting the number of cheese slices 116 at the grill 110, it would introduce a large error into the inventory count if the user accidentally entered the number of cheese slices using a cases unit. For example, if the user counted that there are 50 cheese slices at the grill, but then entered that into his or her inventory count as 50 cases, the final inventory count will be far greater than what it actually is. As one method to solve this problem, the systems, methods, and devices herein can be configured to only allow a user to enter counts using appropriate units for the storage location the user is currently counting and/or for the item the user is currently counting. For example, if the user is counting cheese at the grill 110, the user access point system 130 can be configured to only enable the user to enter counts in the slices or each unit, because that is the only type of unit anticipated to be stored at the grill 110. However, if the user is counting cheese at the refrigerator 112, the user access point system 130 can be configured to enable both slices and packages units, since both of those types of units are anticipated to be stored at the refrigerator 112.

While a user access point system 130 can be configured to enable a user to input counts using the appropriate and/or most convenient unit, the counting engine 102 of the inventory system 100 can be configured to convert counts to a standard unit, such as eaches or slices. For example, if there are 20 cheese packages in a case and 50 cheese slices in a package, then the counting engine 102 can be configured to convert in its inventory database 106 a count of one cheese case into an equivalent count of 1,000 cheese slices. The details of how the inventory system and the user access point systems can be configured to operate are described in more detail below with respect to the following figures.

User Access Point Systems

Figure 2A:
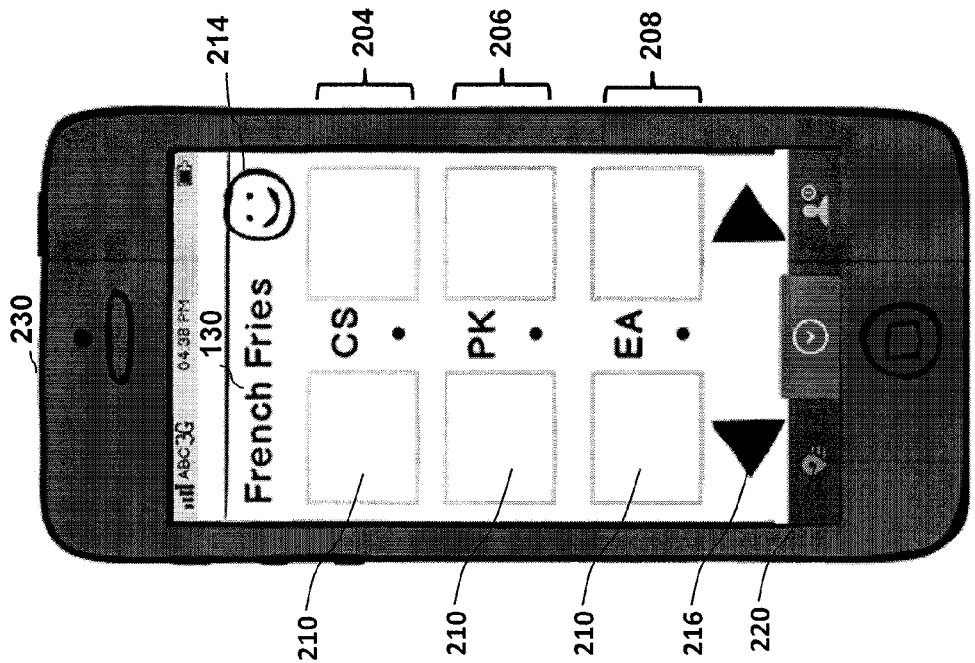
FIGS. 2A and 2B are embodiments of schematic diagrams illustrating a user access point system operating as part of an inventory system.
Figure 2B:
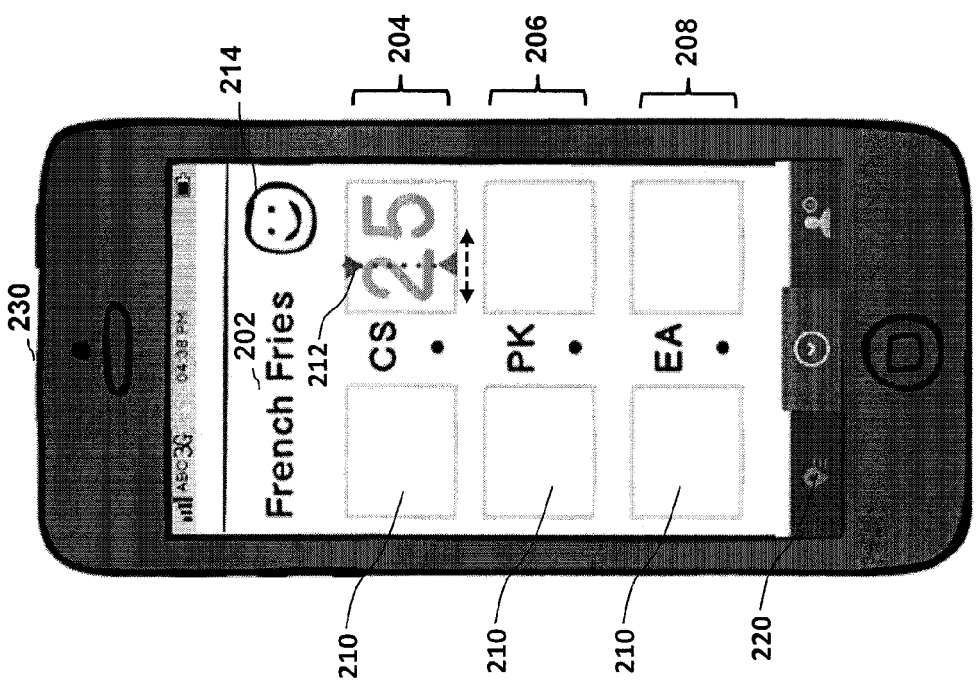

FIGS. 2A and 2B are embodiments of schematic diagrams illustrating a user access point system 230 operating as part of an inventory system. FIGS. 2A and 2B illustrate various aspects of a user interface of the user access point system 230 that can be configured to enable a user to easily and efficiently count items as part of an inventory. The user access point system 230 can be configured to communicate with an inventory system, such as the inventory system 100 illustrated in FIG. 1 or the inventory systems illustrated in FIGS. 5A and 5B to, among other things, determine what item needs to be counted, what storage location the item is stored at, what the anticipated theoretical count is, to transmit count data to the inventory system, and/or the like. The user access point system 230 can comprise in some embodiments a touch-sensitive or touchscreen interface.

The user interface illustrated in FIG. 2A shows a user in the process of counting French fries as part of a physical inventory. The display of the user access point system 230 comprises an item indicator 202, a visual status indicator 214, a locations button 220, and three sets of count inputs 210 for three different units, namely cases 204, packages 206, and eaches 208. The item indicator 202 can be configured to display the current item being counted. In this case, the item indicator 202 contains the words French Fries to indicate that the user is counting French fries. In some embodiments, the item indicator 202 can incorporate a graphic, an image of the item being counted, and/or the like.

In this embodiment, each of the count inputs 210 comprise two boxes separated by a decimal point. These boxes can be used to enter a count as the user is counting. For example, as shown in FIG. 2A, the user has currently counted 0.25 cases of French fries. Accordingly, the right most count input 210 of the cases section 204 comprises the number 25. In some embodiments, the boxes of the count inputs 210 can be configured to increment when a user taps on them. Further, they can be configured to increment in various other ways, such as sliding the user's finger up or to the right to increment the box or sliding the user's finger down or to the left to decrement the box. As another example, the boxes can be configured to decrement the number when a user taps on the right side of the box and to increment when the left side is tapped on. In some embodiments, the user access point system 230 can be configured to receive audio input to perform counts, such as a user speaking numbers to the device. In some embodiments, tapping on one of the count input boxes 210 brings up a virtual keyboard for the user to enter a number. In some embodiments, a slider 212 can be used to change the number in the count inputs 210. For example, the slider 212 can be configured to slide left and right as a user places his or her finger on the slider and slides his or her finger left or right. For example, if the slider 212 is slid left, the number in the associated box will go down. If the slider 212 is slid to the right, the number in the associated box will go up. In some embodiments, the slider 212 incorporates virtual detents, wherein the slider can be easier to position at common locations, such as, for example, all the way to the left or right, or exactly in the middle.

In some embodiments, the user access point system 230 comprises a visual status indicator 214. In some embodiments, the visual status indicator 214 comprises an emoticon which can have various faces, such as a happy face, a sad face, a neutral face, and/or the like. The visual status indicator 214 can in some embodiments be configured to indicate to the user when there is a problem with the count, when the count appears to be completed, when the count appears to not yet be completed, and/or the like. In this embodiment, the visual status indicator 214 is a happy face. That happy face may, for example, be indicative of 0.25 cases of French fries being the correct amount that the inventory systems believes or projects there should be in inventory. In some embodiments, as further described below, the visual status indicator 214 can be configured to be driven by the projection engine of the inventory system based on how close the current actual count is to a projected theoretical current count.

The user interface illustrated in FIG. 2B is similar to the user interface illustrated in FIG. 2A, except the user interface illustrated in FIG. 2B adds left and right arrows 216. The left and right arrows 216 can be used to, for example, change to a different item to count, change to a different screen, change to a different location being counted, to increment or decrement the count of the current units, and/or the like. In some embodiments, the interface can be configured to switch items when the user swipes left or right. The storage locations button 220 of the user access point system 230 can be configured to, upon being selected by user, display a list of storage locations at which the current item or any other items may be found. The user can then select one of these locations to indicate which location the user will be counting an item at. In some embodiments, the user access point system 230 can be configured to display various information relating to an item when the item indicator 202 is selected.

FIGS. 3A-3F are embodiments of a schematic diagram of another embodiment of a user access point system 330 operating as a part of an inventory system. The embodiments illustrated in FIGS. 3A-3F illustrate an example of how the user access point system 330 and associated inventory system may operate as a user is counting an item for an inventory, in this case cheese. The user access point system 330 comprises an item indicator 302, a location indicator 320, a countdown indicator 322, a visual status indicator 314, a plurality of count inputs 310, for a plurality of units 304, 306, and 308, and a submit button 324. In this embodiment, the item indicator 302 indicates that cheese is the current item being counted. Left and right arrows next to the item indicator 302 can be configured to, for example, enable a user to select a different item to be counted. Note that an inventory system as described herein may be configured to have different items counted on different frequencies. For example, some items may be counted daily, some weekly, some monthly, and/or the like. Accordingly, when a user tries to select a new item to count, the inventory system may be configured to only give a subset of all of the items in inventory to allow the user to count. For example, if hamburger patties are a weekly count item, and hamburger patties were just counted yesterday, then the inventory system can be configured to not enable the user to select hamburger as the item to be counted using the user access point system 330. However, if, for example, cheese and French fries are both intended to be counted today, selecting the arrows of the item indicator 302 may enable the user to toggle between cheese and French fries, since they both need to be counted today.

The location indicator 320 can be configured to show or define the current storage location at which the user is counting. In some embodiments, the location indicator 320 can be configured to tell the user where to count and to not enable the user to select a different location to count. For example, the inventory system may have a reason that it wants a freezer to be counted before any other storage locations. In that example, the arrows of the location indicator 320 would not enable the user to select a different location to count first. In other embodiments, the user access point system 330 can be configured to enable the user to select a different storage location to count by, for example, using the arrows of the location indicator 320.

In some embodiments, an inventory system can be configured to know what units are appropriate for what items and storage locations. For example, in this embodiment, when cheese is being counted it the freezer, the inventory system may be configured to know that only cases is the appropriate unit. Accordingly, as illustrated in FIG. 3A, the packages 306 and eaches 308 units are disabled, which is shown by the diagonal lines through the boxes 310. In some embodiments, rather than just disabling the other units, the user access point system 330 may be configured to only display appropriate units such that the non-appropriate units are not even displayed on the user access point system 330.

The countdown indicator 322 can be configured to display a projected theoretical number of items that are left to count. For example, the projection engine of the inventory system can be configured to project what the real-time theoretical inventory level of the item, in this case cheese, is, and to subtract off of that number anything that has already been counted by the user. The projected theoretical current inventory minus the number of items that have already been counted results in the number of items projected to be left to be counted, which is the number in the countdown indicator 322. In this case, the user has already counted three cases of cheese in the freezer, and the inventory system has determined that 587 cheese slices remain to be counted. In some embodiments, the countdown indicator can be configured to be specific to the current storage location. In other embodiments, the countdown indicator 322 can be configured to be specific to just a single item but not the storage location. In some embodiments, the countdown indicator can be configured to use the same units as the user is currently counting in.

The visual status indicator 314 can be configured to indicate to the user when there is a problem and/or when there are more items to be counted, either overall or at the current storage location, and/or the like. In this embodiment, the visual status indicator 314 illustrates an unhappy face, because, for example, the inventory system has determined that there are still additional cases of cheese expected to be in the freezer.

Figure 3B:
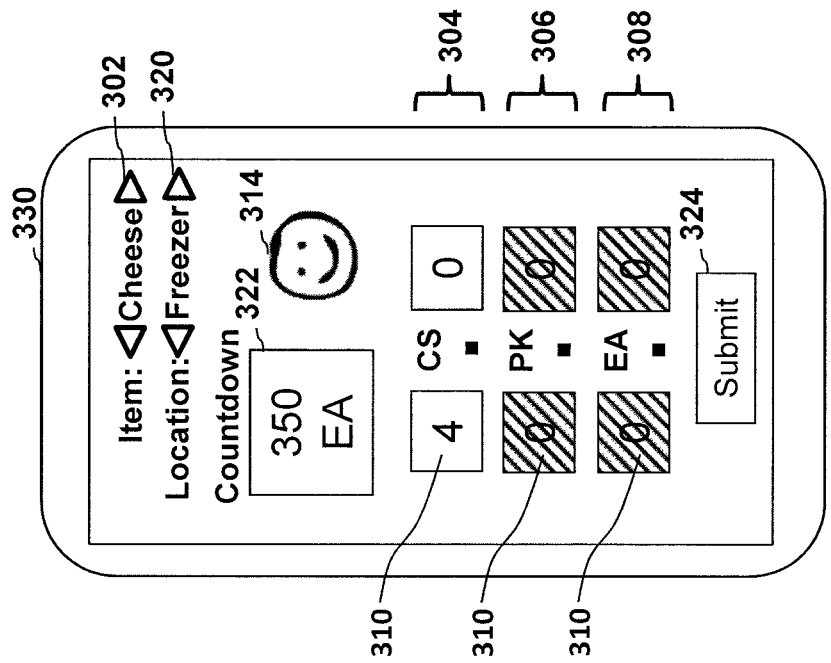
FIGS. 3A-3F are embodiments of schematic diagrams illustrating another user access point system operating as part of an inventory system.
Figure 3A:
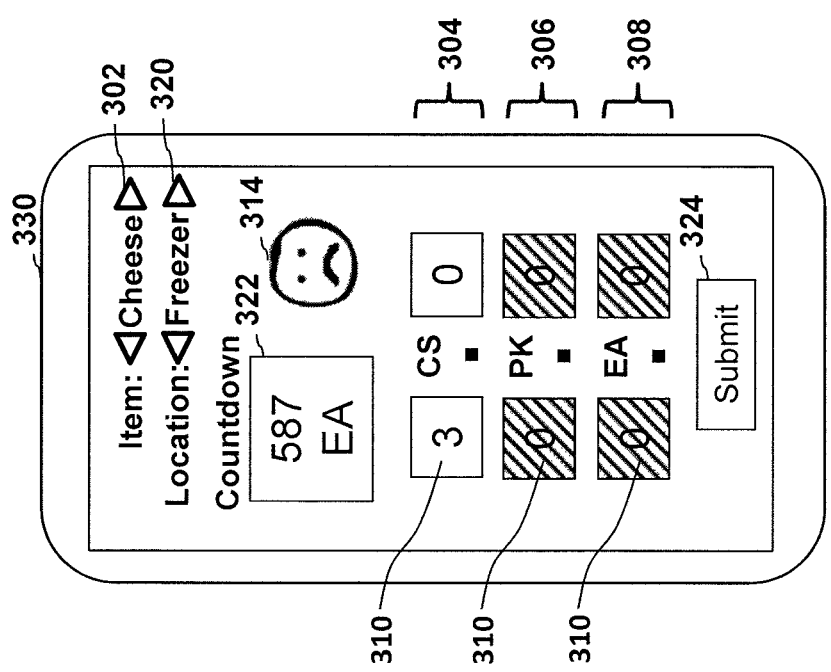

FIG. 3B illustrates the user interface of the user access point system 330 after the user has counted one more case of cheese, and the inventory system has determined that the current count in the freezer is likely the correct count. Accordingly, the visual status indicator 314 has changed to a happy face. This indicates to the user that the user's count in the freezer is likely accurate and the user is okay to move on to the next location. In some embodiments, the user access point system can be configured to enable the user to select the submit button 324 to submit or confirm or commit the current count. This may, for example, input the count data to the inventory system and enable the user to, for example, return to his or her normal working duties to complete inventory of other storage locations at a later time. In some embodiments, the submit button 324 is not required, and the inventory system is configured to automatically save count data received from the user access point system 330. In this embodiment, since the user is done counting cheese at the freezer, the user may select, for example, the right arrow of the location indicator 320 to move to the next location for which cheese should be counted.

Figure 3D:
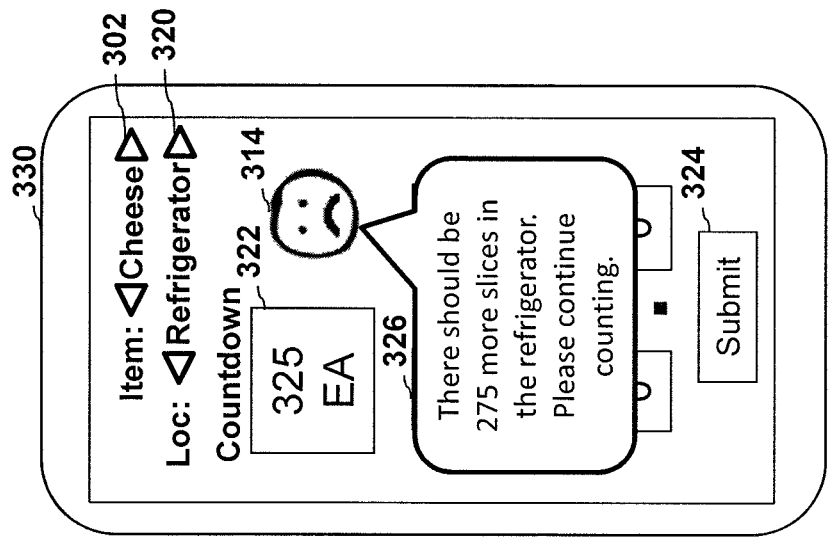
Figure 3C:
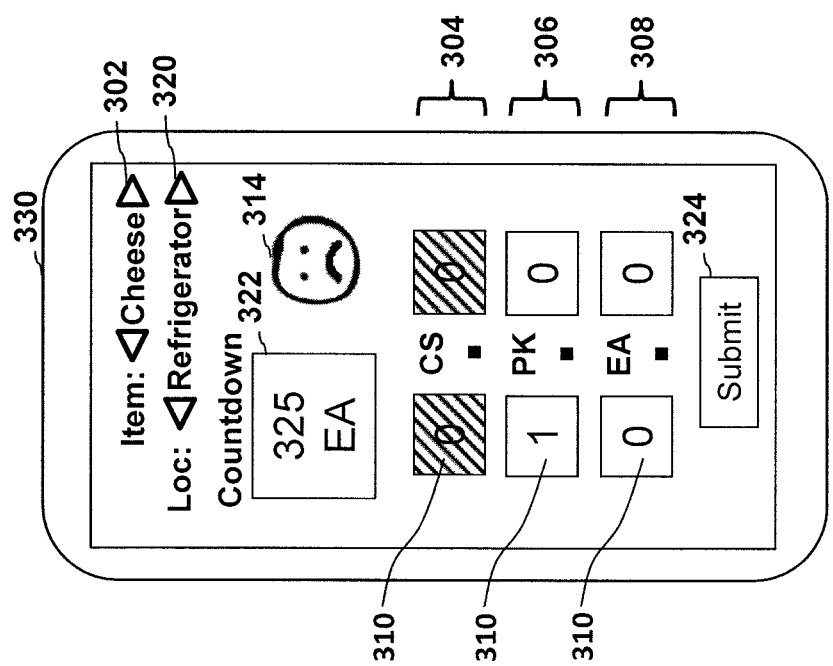

FIG. 3C depicts a similar embodiment to the embodiments illustrated in FIGS. 3A and 3B, except now the user is counting cheese at a refrigerator location instead of a freezer location. In this case, the inventory system has determined that cases of cheese are not typically stored in the refrigerator, but packages and eaches or individual slices are stored in the refrigerator. Accordingly, the cases units 304 has been disabled. However, the packages and eaches units have been enabled. In this embodiment, the visual status indicator 314 has returned to a sad face, because the inventory system has determined that there is still more cheese to be counted at the refrigerator location. As shown in FIG. 3C, the user has currently counted one package of cheese, which has reduced the countdown indicator 322 from 350 to 325 (assuming a package consists of 25 slices).

A user may sometimes desire to know why the visual status indicator 314 is indicating to the user that there is a problem or that other items remain to be counted. For example, maybe in this case the user only saw one package of cheese in the refrigerator and is not sure why the visual status indicator 314 is showing a sad face. Accordingly, in some embodiments, the inventory system can be configured to provide an explanation to the user when the user selects the visual status indicator 314. As shown in FIG. 3D, in this embodiment, after the user selects the visual status indicator 314, a textbox 326 is caused to be displayed that informs the user why the visual status indicator is a sad face. In this case, the textbox 326 indicates that there should still be 275 more slices remaining in the refrigerator. Accordingly, the user should search the refrigerator for these additional 275 slices. In some embodiments, the visual status indicator 314 updates in real-time. In some embodiments, the visual status indicator 314 updates only after the user access point system 330 has submitted count data to the inventory system. In some embodiments, the text box 326 comprises a pop-up, a tooltip, and/or the like.

Once the user has completed counting cheese at the refrigerator location, the user may select the submit button 324 to indicate to the inventory system that the user is done counting the refrigerator location. As shown in FIG. 3E, the visual status indicator 314 may change to a happy face to indicate to the user that the count appears to be accurate and/or within a tolerance of a variance. In some embodiments, the user access point system 330 can be configured to display another text box 326 telling the user how the user is doing and/or instructing the user where to go next. In this example, the textbox 326 indicates that the user has done a great job and that the user should next count the grill.

Figure 3F:
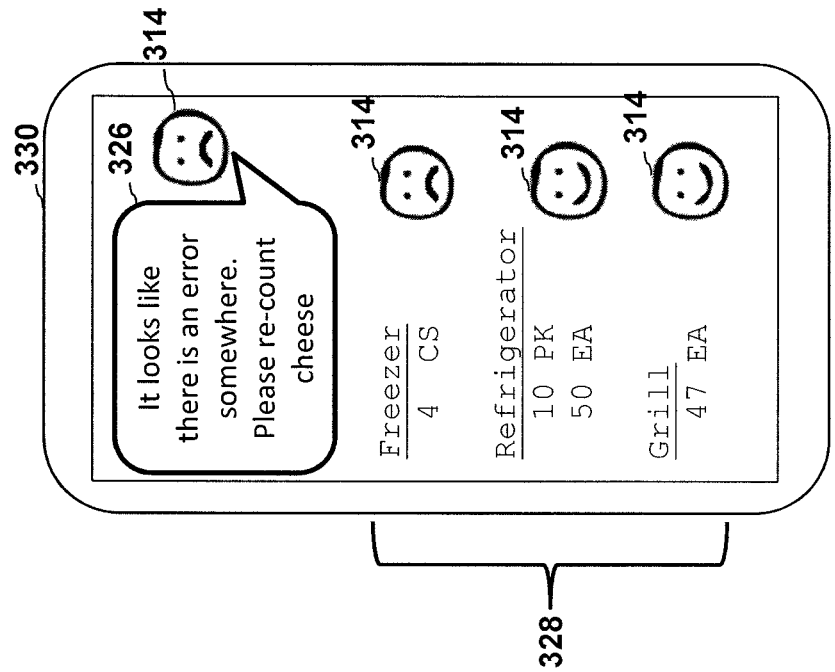
Figure 3E:
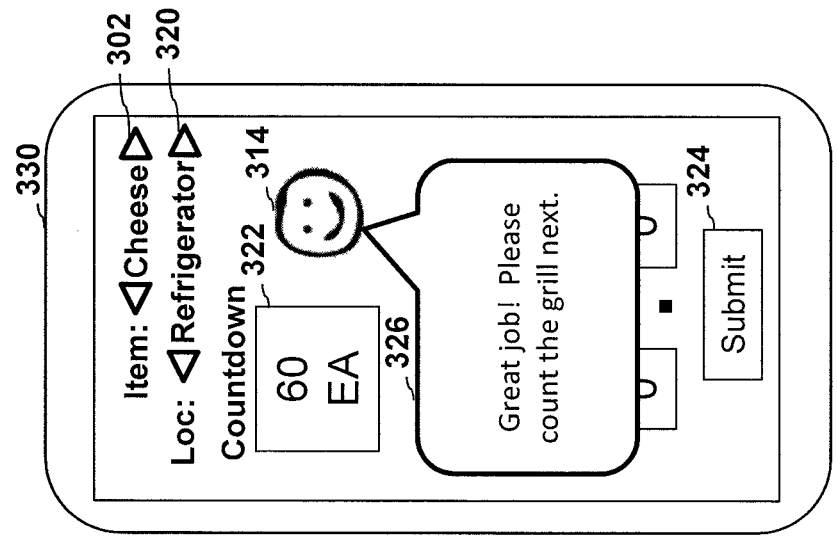

FIG. 3F illustrates an example embodiment of the user access point system 330 after the user has counted all three storage locations where cheese is stored, namely, the freezer, the refrigerator, and the grill. However, the inventory system has determined that there is an error in the inventory count. For example, the system may have determined that the final count by the user is out of a threshold variance when compared against the projected theoretical current inventory. Accordingly, the user access point system 330 is configured to display a textbox 326 that indicates there is an error somewhere and that the user should recount cheese. The user access point system 330 further comprises a summary 328 that summarizes what the user counted at each location with each location having its own visual status indictor 314 to help give the user an idea of where the issue might be. In this example, happy faces are shown next to the refrigerator and grill, but a sad face is shown next to the freezer. Accordingly, this indicates to the user that the freezer is the most likely place where the problem occurred.

The embodiment illustrated in FIG. 3F illustrates one example of the concept of recycling. Recycling means that when an item has been counted, the inventory system may be configured to recycle that item, meaning it wants the user to recount it, because, for example, the inventory system may have determined that there was an error in the count. In this embodiment, the system is configured to explicitly tell the user that there is an issue and that the item should be recycled or recounted. In other embodiments, however, the system can be configured to recycle items randomly without an explanation, to not inform the user that the item is being recycled, but just ask the user to count that item again at a later period of time, and/or the like.

Inventory Data

FIG. 4 is a table illustrating an example of data stored in an embodiment of an inventory system database. For example, the information illustrated in FIG. 4 may be stored in, the inventory database 106 and/or the various databases illustrated in FIGS. 5A and 5B. The table 400 illustrated in FIG. 4 comprises seven columns. The columns comprise an items column 402 indicating the inventory item, a projected real-time inventory 404 which indicates the projected real-time inventory of each item, and a last actual count 406, which indicates the most recent actual physical count of the item. The columns further comprise a days since last count 408 column, which indicates the number of days that have passed since the item was last physically counted. A latest variance percentage column 410 indicates the percentage variance the last time that item was physically counted. The latest variance dollar column 412 indicates the dollar amount variance from the last time that item was physically counted. Finally, the scheduled count frequency column 414 indicates how frequently each item is scheduled to be counted. In this case, four different frequencies are given, namely, daily 420, weekly 422, monthly 424, and bimonthly 426. Note that the table in FIG. 4 is merely an example. An inventory system may comprise more, less, and/or different information than is shown in FIG. 4.

In this embodiment, the items have been sorted by latest variance dollars, with the item having the highest dollar amount variance on top and the item having the lowest dollar variance on bottom. In this example, the last time hamburger patties were counted, there was a $500.00 variance. However, the last time dishwashing soap was counted, there was a zero dollar variance. In this embodiment, the count frequency has been scheduled based on the dollar variance amount. Accordingly, the two items having the largest dollar variance, in this case hamburger patties and cheese, are currently scheduled to be counted daily. However, two of the items having low dollar variance, in this case napkins and ketchup packets, are on the monthly count frequency. In various embodiments, the inventory data can be configured to be updated in real time in response to sales and/or physical inventory counts, to adjust count frequencies to adapt to a current situation. Accordingly, the count frequency for an item may even change as one or more users are performing inventory counts.

In some embodiments, the system can be configured to always have a certain number of items in each scheduled count frequency. For example, the system can be configured to always have two items which are counted daily, two items which are counted weekly, and two items which are counted monthly. The system can be configured to then sort the items based on variance, which may be variance dollars, variance percent, variance units, and/or the like, and to simply bucket the items into the different count frequencies. In other embodiments, a threshold amount can be defined to define when an item is counted at a certain frequency. For example, the system may be configured to set any item that has a variance greater than $100.00 to be a daily count frequency. The system may further be configured to set any item that has a variance between $100.00 and $50.00 to be a weekly count frequency, and/or the like. In some embodiments, the threshold amount can be dynamically based on the real-time variance of one or more other items. For example, the system may be configured correctly statistical values of the various item variances, such as, an average and standard deviation, and to set one or more thresholds based on those values.

Inventory Systems

Figure 5A:
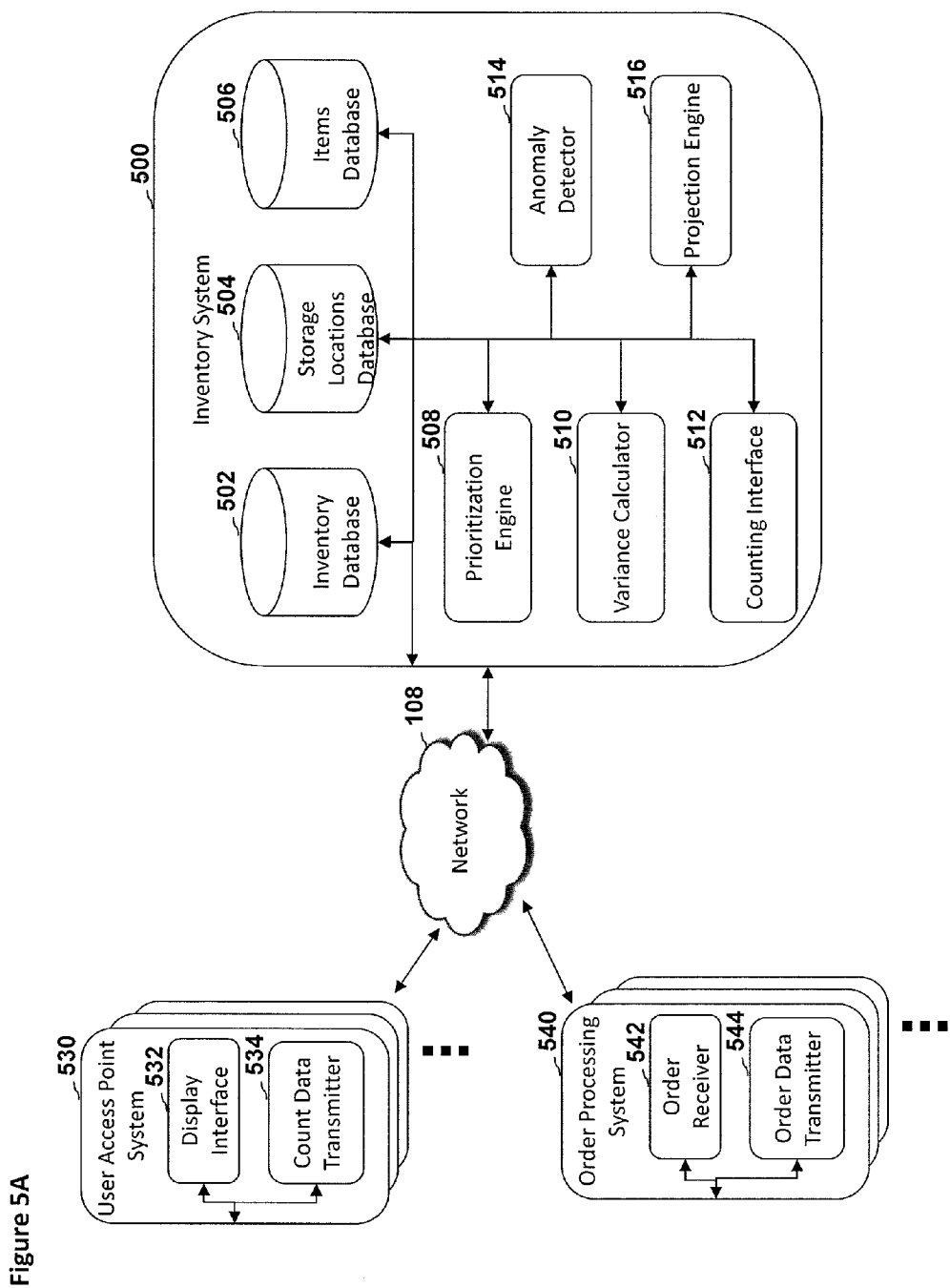
FIG. 5A is a block diagram depicting an embodiment of an inventory system in communication with one or more other systems.

FIG. 5A is a block diagram depicting an embodiment of an inventory system 500 in communication with one or more other systems. In this case, the inventory system 500 is configured to communicate through the network 108 with a plurality of user access point systems 530 and order processing systems 540. The network 108 may be, for example, a local area network, the internet, a wide area network, a cellular network, an Ethernet network, and/or the like. The user access point systems 530 comprise a display interface 532 and a count data transmitter 534. The display interface 532 can be configured to enable a user to interact with the user access point system 530 to among other things, receive instructions as to what needs to be counted and where it needs to be counted, and to enter count data as the user is counting items. The display interface 532 can be configured to operate similarly to as illustrated in FIGS. 2A-2B and 3A-3F, as described above. The count data transmitter 534 can be configured to electronically communicate with the inventory system 500 to, among other things, transmit count data from the user access point system 530 to the inventory system 500 and receive corresponding information from the inventory system 500.

The order processing systems 540 comprise an order receiver 542 and an order data transmitter 544. The order processing systems 540 may be, for example, similar to the point of sale order processing systems 140 illustrated in FIG. 1. The order receiver 542 can be configured to enable a user to input an order from a customer. For example, the order receiver 542 can be, for example, a touchscreen interface that enables an employee to enter a fast food order received from a customer. In some embodiments, the order receiver 542 can be, for example, an electronic interface configured to receive an order through a cellular data network or the internet. The order data transmitter 544 can be configured to transmit information relating to an order to the inventory system 500. For example, the order data transmitter 544 can be configured to transmit information to the inventory system 500 to enable the inventory system 500 to track what items have been sold to update its real-time projections of a real-time inventory level of all items.

The inventory system 500 comprises an inventory database 502, a storage locations database 504, and an items database 506. The inventory system 500 further comprises a prioritization engine 508, a variance calculator 510, a counting interface 512, an anomaly detector 514, and a projection engine 516. The items database 506 can be configured to store information relating to the various items in the systems inventory. For example, the items database 506 can be configured to store information that describes each item in the inventory and at what frequency each item should be counted. The storage locations database 504 can be configured to store information or data related to the variety of storage locations at the business. For example, the storage locations database 504 may be configured to store data related to storage locations that define a business' storage locations such as grill, refrigerator, freezer, storage closet, etc. The inventory database 502 can be configured to store information related to taking an inventory, such as the count information or data provided by the user access point systems 530, the projected real-time inventory values, and/or the like. In various embodiments, the functions of the three databases of the inventory system 500 can be combined into less databases and/or separated out into more databases. In some embodiments, the information illustrated in the table of FIG. 4 can be stored in one or more of the databases shown in FIG. 5A. In various embodiments, the databases can be configured to store more or less information than is shown in FIG. 4.

The prioritization engine 508 can be configured to prioritize which items should be counted more than others. For example, the prioritization engine 508 can be configured to analyze variance amounts for various items and to determine which items should be counted at what frequencies. The variance calculator 510 can be configured to calculate a variance when a user is performing a physical inventory. For example, the variance calculator 510 can be configured to calculate a variance by taking the last physical count's inventory number and subtracting from it any theoretical usage from sales since the last inventory, subtracting estimated loss through waste or theft, and adding or subtracting any other relevant numbers to come up with a projected theoretical current inventory level. This number can then be compared to the actual count from the physical count to determine a variance amount. That variance amount can be used by, for example, the prioritization engine 508 to determine a frequency of counting for that item, and/or the anomaly detector 514 as further described below. In some embodiments, variance is calculated based on the last physical count, adjusted for theoretical usage, without adjusting for any estimated losses.

The counting interface 512 can be configured to communicate with the user access point system 530 through the network 108 to receive count data from the user access point system 530 and to send any instructions to the user access point system 530 to configure the user access point system 530 to enable the user to count a specific item or location, to enable or disable units at particular storage locations or for particular items, and/or the like.

The anomaly detector 514 can be configured to detect when there is likely an anomaly or error in the user's physical inventory count. For example, the anomaly detector 514 can be configured to have a threshold value that, when a variance exceeds that threshold value, the anomaly detector 514 forces a recycling of that item or recounting of that item. For example, the anomaly detector 514 may be configured to utilize a unit threshold, dollar amount threshold, percentage threshold, and/or the like. For example, the anomaly detector 514 may be configured to determine that when there is a variance of over 20%, there is likely an error, and that item should be recounted or recycled.

The projection engine 516 can be configured to project past, current, and/or future inventory levels of various items. For example, the projection engine 516 can be configured to estimate or determine a current real-time inventory level of an item based on the last actual inventory count after being adjusted by any actual and theoretical usage or loss of the item. In some embodiments, the projection engine 516 can also be configured to take into account additions to the inventory since the last physical count. For example, napkins may be a monthly count item, because the variance is typically very low. Accordingly, it may have been 20 days since napkins have been counted. However, ten days ago, a shipment of napkins may have been received. Accordingly, the projection engine 516 can be configured to also add in the shipment or delivery amount to its projection to more accurately project what the current real-time inventory is of napkins or other items.

Figure 5B:
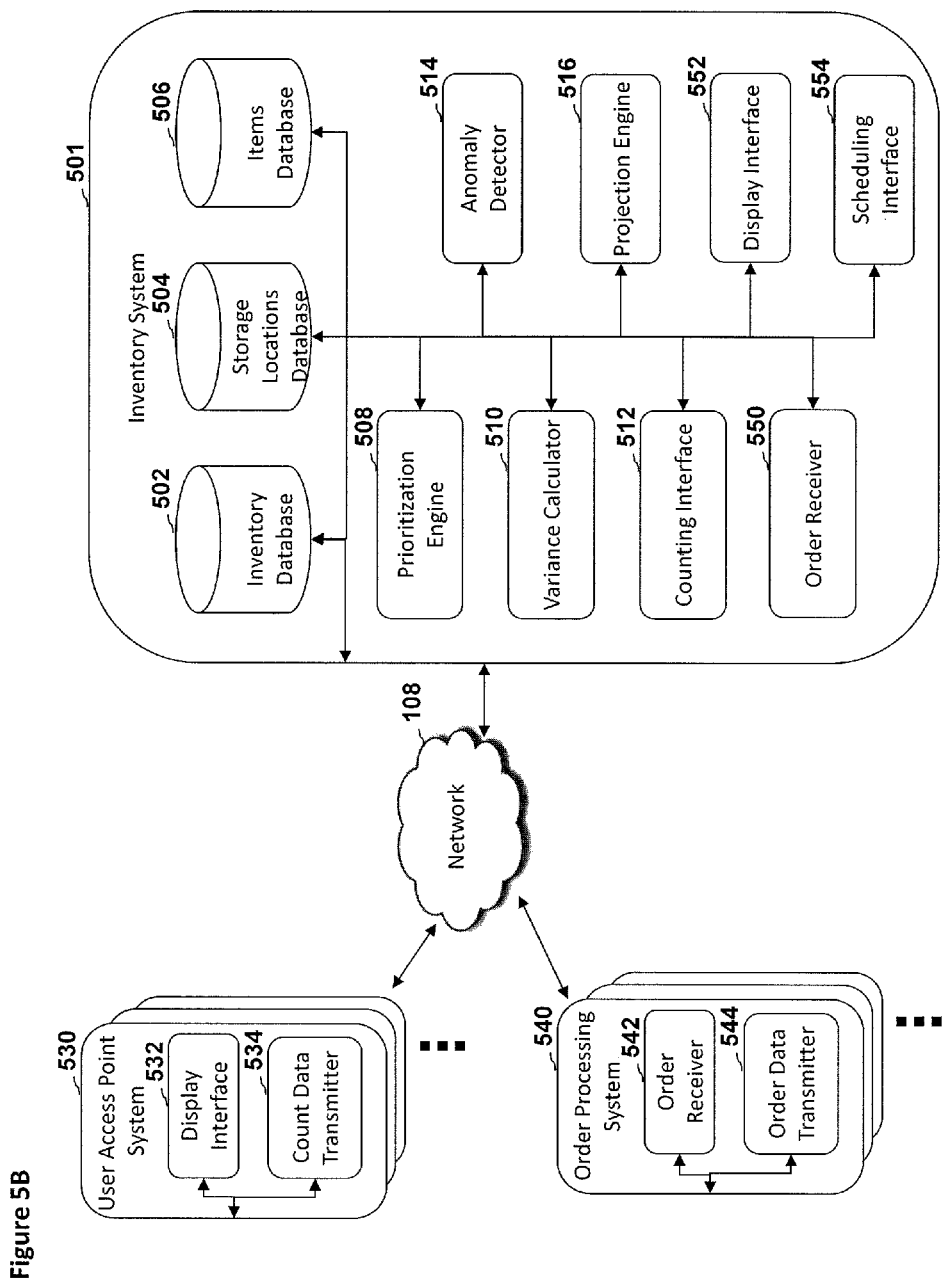
FIG. 5B is a block diagram depicting another embodiment of an inventory system in communication with one or more other systems.

FIG. 5B is a block diagram depicting another embodiment of an inventory system 501 in communication with one or more other systems. The inventory system 501 is similar to the inventory system 500 illustrated in FIG. 5A. However, the inventory system 501 illustrates that the inventory system in some embodiments can be a self-contained system. For example, the inventory system 501 adds an order receiver 550 and a display interface 552. The order receiver 550 can be configured to operate similarly to the order receiver 542 of the order processing systems 540. Accordingly, the inventory system 501 can be configured to take orders itself without needing to communicate with order processing systems 540 to determine current or past usage of items. The display interface 552 can be configured to operate similarly to the display interface 532 of the user access point systems 530. Accordingly, the inventory system 501 can be configured to enable a user to directly interact with the inventory system 501 to take physical inventory counts, without requiring communication with separate user access point systems 530. However, as illustrated in FIG. 5B, a self-contained inventory system such as the inventory system 501 can further be configured to communicate through a network 108 with a plurality of user access point systems 530 and/or order processing systems 540 to enable both local and remote use of the system. The inventory system 501 additionally comprises a scheduling interface 554. The scheduling interface 554 can be configured to track, determine, and/or set employee or other resource schedules. For example, the scheduling interface 554 can be configured to dynamically determine what employees or personnel are currently on duty, so that the system can, for example, determine who should be instructed to count one or more items. In some embodiments, the scheduling interface can be configured to electronically communicate with a separate scheduling system to track, determine, and/or set employee or other resource schedules.

Inventory Processes

FIG. 6A depicts an embodiment of a process flow diagram illustrating an example of automatically adjusting item count frequencies. The process flow illustrated in FIG. 6A can be implemented, for example, by the inventory systems illustrated in FIGS. 5A-5B or FIG. 1. The inventory system starts the process at block 602. At block 604, a prioritization engine determines an item that needs to be counted. For example, the prioritization engine 508 illustrated in FIG. 5A can be configured to access the inventory database illustrated at block 606, which may be the inventory database 502, to determine an item that needs to be counted. For example, the system may determine that cheese is a daily item to be counted and has not yet been counted today. As another example, the system may determine that hamburger patties is a weekly item to be counted and it has been one week since the last time hamburger patties were counted.

At block 608, the projection engine calculates a theoretical current count for the item based on real time usage data. For example, the projection engine can be configured to take the last physical count data, and adjust it for any actual and/or theoretical use of the product, and any actual or theoretical gain or loss in the product to determine a theoretical current count which can later be utilize to calculate a variance as compared to the current actual count. Note that block 608, as with some other blocks, is optional and may not always be performed in all embodiments.

At block 610, a counting interface transmits count request data to a user system. For example, the counting interface 512 can be configured to transmit through the network 108 to the user access point system 530 data that instructs the user access point system to enable a user to count hamburger patties. In some embodiments, the request data incorporates the theoretical current count calculated at block 608 to enable the user access point system 530 to operate a countdown indicator, such as is illustrated in FIG. 3A.

At block 612, the user system enables the user to enter count data. For example, the system can be configured to, as illustrated in FIG. 3A, enable the user to enter case counts while counting cheese in a freezer. At block 614, the user system transmits the count data to the inventory system. For example, the user access point system 530 can be configured to, utilizing its count data transmitter 534, transmit the count data entered by the user through the network 108 to the inventory system 500.

At block 616, the projection engine calculates or updates the prior calculation of the theoretical current count based on real-time usage data. For example, the theoretical current count calculated at block 68 may need to be adjusted based on real-time usage that occurred between the time of the theoretical current count being calculated at block 608 and the count data being transmitted to the inventory system at block 614. At block 618, a variance calculator determines a variance between the actual and theoretical counts. For example, the variance calculator 510 illustrated in FIG. 5A can be configured to compare the theoretical current count determined at block 616 to the actual account received from the user access point system to determine a variance between the two.

At block 620, an anomaly detector accesses an anomaly threshold variance value in, for example, the inventory database illustrated at block 606. The anomaly threshold variance value can be configured to be a value that, when exceeded, is likely to indicate that there is an error in the count or that some other anomaly exists.

At block 622, the process flow varies depending on whether the variance determined at block 618 exceeds the anomaly threshold variance value. If the variance exceeds the anomaly threshold, the process flow proceeds to block 624. At block 624, the item is recycled. For example, the inventory system may determine to have that item recounted either immediately or at some time in the future. The process flow then varies based on whether the process flow should continue, such as by having another item counted, or whether the counting process is complete. If, at block 650, the process flow should continue, the process flow proceeds back to block 604, where, for example, the next item to be counted can be determined. If, at block 650, the process flow is complete, the process flow ends at block 652. Returning to block 622, if the variance threshold is not exceeded at block 622, the process flow proceeds to block 626.

At block 626, the prioritization engine accesses a high threshold variance value. For example, the prioritization engine can access the inventory database 606 to access a high threshold variance value that, when exceeded, indicates that the threshold is high enough that the item should be counted more frequently. At block 628, the process flow varies depending on whether the high threshold variance value is exceeded. If the high threshold variance value is exceeded, the process flow proceeds to block 630. At block 630, the counting frequency of this item is increased, such that it is counted more frequently. The process flow then proceeds to block 650. If the high threshold variance value is not exceeded at block 628, the process flow proceeds to block 632.

At block 632, the prioritization engine accesses a low threshold variance value in the inventory database at block 606. At block 634, the process flow varies depending on whether the low threshold variance value is exceeded. If the low threshold variance value is not exceeded, the inventory for this item is completed and the process flow proceeds to block 650. If the low threshold variance value is exceeded at block 634, the process flow proceeds to block 636. For example, a low threshold variance value may be a value that, once a variance is below that value, the system determines that item does not need to be counted as frequently. For example, a low threshold variance value may be $25.00. If the variance of a counted item is $10.00, then the process flow would proceed to block 636. At block 636, the system is configured to decrease the counting frequency of that item. For example, if this item was counted daily, the system may decrease the frequency to weekly. The process flow then proceeds to block 650.

Although in various embodiments described herein, counting frequencies are defined as daily, weekly, monthly, and/or the like, counting frequencies do not have to be based on certain calendar spans, such as days, weeks, months, years, and/or the like. In some embodiments, a counting frequency can be every two days, every three days, every four and a half days, every day and a half, whenever a certain amount of theoretical use or estimated loss has occurred, on demand, and/or the like.

Further, an inventory system as described herein may further include a randomness factor that randomly causes one or more items to be counted at a time when it would not necessarily be counted if the system was basing the determination solely on the defined counting frequency for that item. One advantage to this is to not enable users to game the system. For example, a user may know that ketchup packets are only counted once a month. Accordingly, that user may know that he or she may steal some ketchup packets the day after an inventory because the ketchup packets will not be counted again for a month. However, with the randomness factor, a user may never know, even if it is a monthly item, whether it may be counted just a couple of days after the last time it was counted.

Figure 6B:
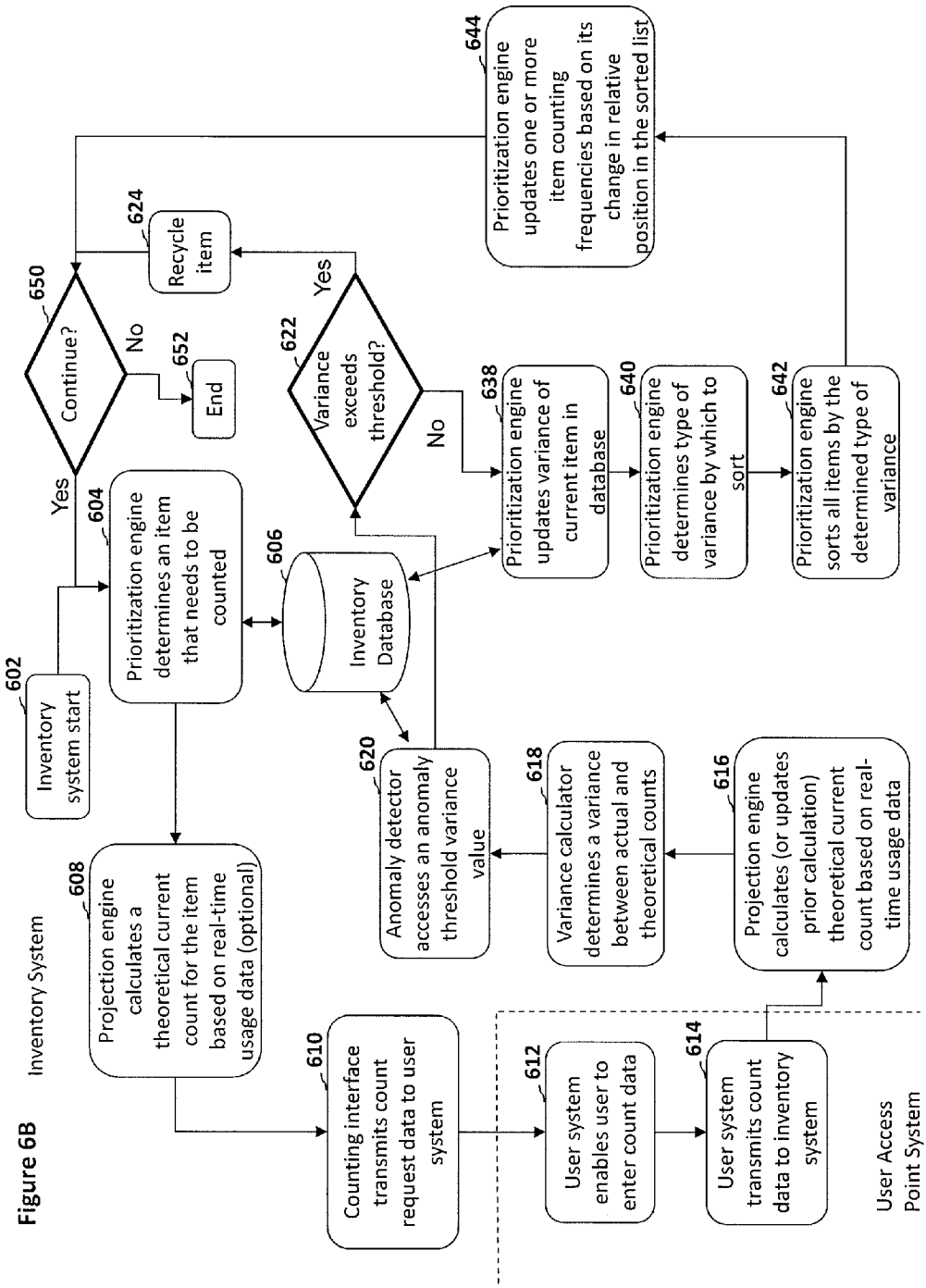
FIG. 6B depicts another embodiment of a process flow diagram illustrating an example of automatically adjusting item count frequencies.

FIG. 6B depicts another embodiment of a process flow diagram illustrating an example of automatically adjusting item count frequencies. The process flow illustrated in FIG. 6B is similar to the process flow illustrated in FIG. 6A for blocks 602-622. However, instead of utilizing threshold variance values to automatically adjust counting frequencies, the process flow illustrated in FIG. 6B utilizes sorting of items and bucketing the items into counting frequencies based on their sort order. At block 622, if the anomaly threshold variance values is not exceeded, the process flow proceeds to block 638.

At block 638, the prioritization engine updates the variance of the current item in the database. For example, the variance calculated at block 618 can be inputted into the inventory database shown at block 606. At block 640, the prioritization engine determines what type of variance to sort by. For example, the system may be configured to sort by dollar variance, percentage variance, unit variance, and/or the like. In some embodiments, this setting can be determined by an administrator.

At block 642, the prioritization engine sorts all items in the inventory by the determined type of variance. For example, as shown in FIG. 4, the items can be sorted by dollar variance with the highest dollar variance on top and the lowest dollar variance on bottom.

At block 644, the prioritization engine updates one or more item counting frequencies based on its change in relative position in the sorted list. For example, with referenced to FIG. 4, if hamburger patties previously had zero dollar variance they were probably in the bimonthly counting frequency 426. However, if hamburger patties now have a $500.00 variance, which is the highest variance, hamburger patties will be placed in the top bucket, which is the daily frequency bucket 420. The process flow then proceeds to block 650, wherein, as described above, the process flow either ends at block 652 or proceeds back to block 604, wherein the prioritization engine determines whether another item needs to be counted.

FIG. 6C depicts an embodiment of a process flow diagram illustrating an example of counting items stored in a plurality of storage locations. The process begins at block 601. At block 603, a prioritization engine determines an item that needs to be counted. For example, the prioritization engine 508 illustrated in FIG. 5A can be configured to access the inventory database shown at block 605 to determine an item that needs to be counted today based on its counting frequency.

At block 607, the prioritization engine determines a location at which the item is stored. For example, the prioritization engine can be configured to access one or more of the databases of the inventory system 500 to determine where the item to be counted is stored and to select one of those storage locations to be counted. At block 609, a projection engine determines what units are applicable to the item and location. For example, with reference to FIG. 3A, the projection engine may be configured to determine that, if cheese is going to be counted at the freezer storage location, only cases is an applicable storage unit.

At block 611, the projection engine optionally calculates a theoretical current count for the item at that storage location. For example, the system may be configured to determine that there are currently supposed to be four cases of cheese in the freezer, based on the previous physical count adjusted by actual usage and theoretical losses or additions. In some embodiments, the system can also or alternatively be configured to project a theoretical total current count, not including just the current storage location to be counted.

At block 613, the counting interface transmits count request data to a user system. For example, the counting interface 512 illustrated in FIG. 5A can be configured to transmit data to a user access point system 530 indicating that the item determined at block 603 needs to be counted at the storage location determined at block 607. The request data may in some embodiments incorporate the projected theoretical current counts determined at block 611.

At block 615, the user system enables the user to enter count data using only the applicable units. For example, the request data transmitted at block 613 may have also comprise the units applicable to the storage location to be counted. Accordingly, the user system can be configured to only enable those applicable units to be utilized by the user, similar to as illustrated in FIGS. 3A-3C.

At block 617, the user system transmits count data to the inventory system. For example, the count data transmitter 534 of the user access point system 530 can be configured to transmit count data entered by the user to the inventory system.

At block 619, the projection engine calculates or updates the prior calculation of the theoretical current count for the item at that location. For example, this may be needed because further sales and/or gains or losses in the theoretical count may have occurred between the time that the theoretical count was determined at block 611 and the time that the count data was received from the user system.

At block 621, a variance calculator determines a variance between the actual and theoretical counts. For example, the variance calculator 510 illustrated in FIG. 5A can be configured to compare the actual count data received from the user system to the theoretical current count to determine a variance.

At block 623, an anomaly detector accesses an anomaly threshold variance value in the inventory database shown at block 605. At block 625, the process flow varies depending on whether the anomaly threshold variance value is exceeded. If the anomaly threshold variance value is exceeded, the process flow proceeds to block 627 and the inventory system recycles the item, meaning instructs the user to recount the item. The instructions to recount the item may be either immediate or in the future and may or may not tell the user why that item is being counted or even inform the user that the recount is a recount. The process flow then proceeds to block 681 and varies depending on whether the process flow should continue, such as because there are more items to be counted. If the process flow should continue, the process flow proceeds back to block 603. If the process flow should not continue, such as because there are no more items to be counted at the present time, the process flow ends at block 683.

If the anomaly threshold variance value is not exceeded at block 625, the process flow proceeds to block 629. At block 629, the process flow varies depending on whether there are additional storage locations that store the item being counted. If there are additional storage locations, the process flow proceeds back to block 607 wherein the prioritization engine determines another location at which the item is stored. The process flow then proceeds as described above.

If, at block 629, all potential storage locations have already been counted, the process flow proceeds to block 631. At block 631, a variance calculator determines a total variance for the item across all locations. For example, the variance calculator can be configured to add up all actual accounts from all storage locations of the item and compare that number to a projected theoretical current count of the item across all storage locations. At block 633, the prioritization engine optionally updates a counting frequency of the item if required. For example, the prioritization engine may utilize the processes illustrated at FIGS. 6A and/or 6B to update counting frequency of one or more items based on variances. The process flow then proceeds to block 681, wherein the process flow will either end at block 683 or proceed back to block 603 where the prioritization engine determines another item to be counted.

Figure 6D:
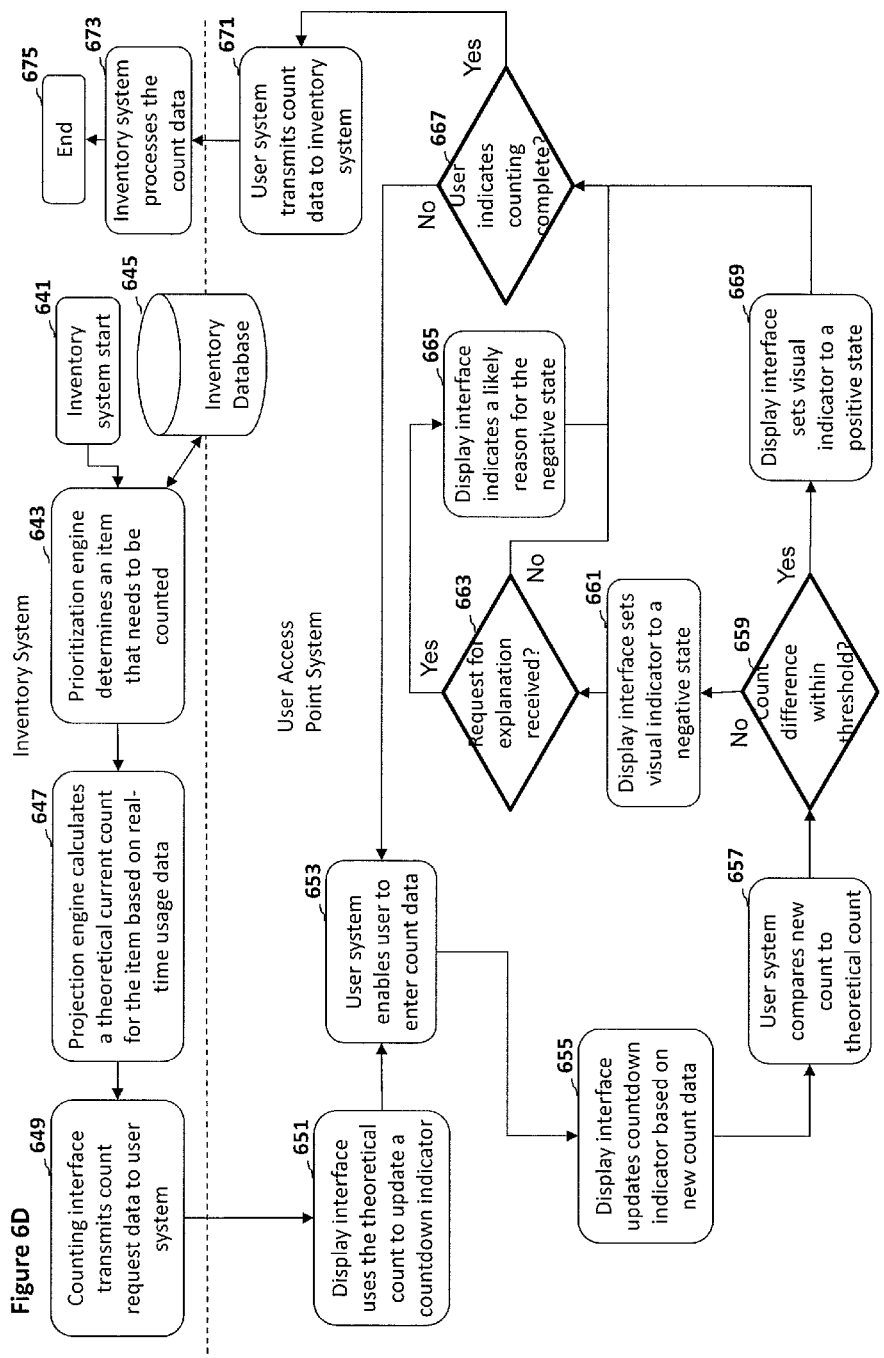
FIG. 6D depicts an embodiment of a process flow diagram illustrating an example of utilizing a user access point system as part of an inventory system to count items.

FIG. 6D depicts an embodiment of a process flow diagram illustrating an example of utilizing a user access point system as part of an inventory system to count items. The process flow begins at block 641. At block 643, a prioritization engine determines an item that needs to be counted. For example, the prioritization engine 508 illustrated in FIG. 5A can be configured to access the inventory database illustrated at block 645 to determine a current item that needs to be counted, such as based on its counting frequency and time since it was last counted. At block 647, the projection engine calculates a theoretical current count for the item based on real time usage data. At block 649, a counting interface transmits count request data to a user system. The count request data may comprise, for example, the item to be counted, one or more locations at which the item should be counted, applicable units for the item and/or locations, and/or the projected theoretical current count for the item.

At block 651, a display interface of a user access point system uses the theoretical count to update a countdown indicator. For example, with reference to FIG. 3A, the user access point system 330 may be configured to update the countdown indicator 322 with the projected theoretical current count received from the inventory system. At block 653, the user system or user access point system enables a user to enter count data. For example, with reference again to FIG. 3A, the user access point system 330 may be configured to enable the user to enter case counts when counting cheese in the freezer. At block 655, the display interface updates the countdown indicator based on new count data received from the user. For example, when the user counts one case of cheese, the countdown indicator 322 can be decremented by the amount of slices of cheese in one case of cheese.

At block 657, the user system compares the new count to the theoretical count. For example, if the user has counted three cases of cheese in the freezer, the user system and/or the inventory system compares that number to the projected theoretical number of slices of cheese in the freezer and/or overall.

At block 659, the process flow varies depending on whether the difference between the current count and the theoretical total is within a threshold value. If the count difference is not within a threshold value, the process flow proceeds to block 661. At block 661, the display interface sets a visual in the indicator to a negative state. For example, as illustrated in FIG. 3A, the display interface can be configured to set the visual status indicator 314 to be a sad face. This is indicative of the current count from the user being below a threshold value. The threshold value can be, for example, that the user count should be within one percent, two percent, five percent, ten percent, and/or the like of the projected theoretical. In some embodiments, the threshold is zero, meaning the visual indicator is set to a negative state until the actual count is identical to the projected theoretical or above the projected theoretical. In various embodiments, the threshold can be set at various levels. In some embodiments, the threshold can even be dynamic, meaning the threshold is set to be more tolerate of differences when the item is a lower value item or not as important as other items. When an item is a more valuable item, the threshold level may be set lower, meaning the actual count needs to get closer to the projected theoretical count before the visual indicator can switch to a positive state.

At block 663, the user system optionally receives a request from the user for an explanation of the negative state of the visual indicator. For example, the user may tap on or otherwise select the visual status indicator using the display interface of the user access point system. If the system receives a request for an explanation of the negative state, the process flow proceed to block 665. At block 665, the display interface indicates a likely reason for the negative state. For example, with reference to FIG. 3D, the display interface can be configured to display a textbox 326 indicating that there should be a certain number more slices of cheese in the current location begin counted. The process flow then proceeds to block 667. If, at block 663, a request for explanation of the negative state is not received, the process flow proceeds directly from block 663 to block 667. Returning to block 659, if the count is within the threshold, the process flow proceeds to block 669. At block 669, the display interface sets the visual indicator to a positive state, such as the happy face visual indicator illustrated in FIG. 3B.

At block 667, the process flow varies depending on whether the user device indicates that counting is complete. For example, the user device may indicate counting is complete based on the user hitting a submit button. In some embodiments the user device may automatically indicate counting is complete when a certain threshold value is counted.

If the user device has not indicated counting is complete, the process flow proceeds back to block 653. The process flow then continues to enable the user to continue entering count data until counting is complete.

When counting is complete at block 667, the process flow proceeds to block 671. At block 671, the user system transmits count data to the inventory system. At block 673, the inventory system processes the count data. For example, the inventory system may process the count data as further described above with respect to FIGS. 6A-6C. The process ends at block 675. Note that, in some embodiments, the user system can transmit partial count data to the inventory system as the user is counting data. The user access point system does not have to wait until an item is completely counted at block 667 to transmit the full data to the inventory system. Rather, in some embodiments, there is a periodic or continual communication between the inventory system and the user access point system for the user access point system to update the inventory system with the current count the user has, and/or for the inventory system to continually update the user access point system with a current projected theoretical count based on real time usage data or sales data that is occurring simultaneously with the user counting the items. This can be advantageous to enable an inventory to be taken while a business is operating. In past inventory systems, inventory often had to occur while a business was closed for business, because real time usage or sales occurring during the inventory would cause the inventory to be inaccurate.

Additional Embodiments

In some embodiments, an inventory system can be configured to transmit messages or alerts to other electronic devices or systems. For example, the inventory system 100 illustrated in FIG. 1 can be configured to transmit one or more messages to one or more of the user access point systems 130 that requests that the user of that system begin an inventory count. For example, a user access point system may be configured to be carried by an employee of a restaurant while he or she is working at the restaurant. The user access point system 130 may further be configured to receive an alert message from the inventory system 100 through the network 108 that alerts the user to an item requiring to be counted and requests that the user count that item.

In some embodiments, the inventory system can be configured to transmit alert messages to, for example, an administrator of the system or manager of the business. For example, the system can be configured to electronically alert a manager when an inventory count indicates that there is an error in the inventory and/or that there is a relatively large variance in one or more items. Further, the system can be configured to enable an administrator of the system to adjust settings of the system. For example, the system can be configured to enable an administrator to manually adjust count frequencies of items, such as to cause one or more items to be counted at a higher or lower frequency than would be automatically determined by the system using the processes disclosed herein. Further, the system may be configured to enable specific items or locations to be assigned to a specific user or user access point system. For example, the system may be configured to know what employees work near what storage locations. For example, the system may be configured to know that Bob works the grill to make hamburgers and cheeseburgers. The system may also be configured to know that a certain user access point system is carried by Bob while he is working at the grill. Accordingly, the system can be configured to, when the system determines that cheese at the grill needs to be counted, transmit a message or an alert message to the user access point system carried by Bob to ask that Bob counts the cheese at the grill. This can be advantageous, because, among other things, it can enable an employee to count the items at his or her normal work area, potentially during downtime, such as when there are no or few orders to process. In some embodiments, the inventory system can be configured to enable one or more users to delegate counting to another user. For example, a user access point system can be configured to enable a user to select another user to assign a specific item and/or location to that other user.

In some embodiments, the systems, methods, and devices disclosed herein can be configured to provide real-time inventory estimates for a plurality of items across a plurality of storage locations on demand. For example, a user of a user access point system may be able to request using the user access point system a summary of current inventory levels or projected current inventory levels for all items stored in the system. This summary can be based on, for example, the real-time estimates or projections calculated using the methods disclosed herein.

Although various embodiments of systems, methods, and devices are described herein, in many cases features of one system, method, and/or device may be combined with another. Accordingly, the embodiments and examples given herein should not be construed to be limiting embodiments or examples. For example, the process flows illustrated in FIGS. 6A and 6B depict processes comprising adjusting a frequency with which an item is counted. FIG. 6D depicts a process that does not explicitly recite adjusting a counting frequency of an item. However, the concepts shown in FIG. 6D, such as updating a countdown indicator and/or visual indicator, can be combined with other processes, such as the processes illustrated in FIGS. 6A-6D.

In some embodiments, an inventory system as disclosed herein can be utilized to replace a physical count by an employee. For example, an inventory system can be configured to project in real time inventory counts based on actual and projected usage and losses, and to determine a variance based on actual physical counts. In some embodiments, the system can be configured to replace a regular or recurring physical count with the estimated count. For example, the system can be configured to regularly instruct an employee to count items that are more valuable and/or have higher variance, but to replace the physical counting of items having a lower value and/or a lower variance with a projected count determined by the system. In some embodiments, the system can be configured to periodically verify the projected count. For example, a system may be configured to instruct a user to count bacon, an item having a high dollar value, daily or weekly. However, the system may be configured to replace a physical count of napkins, an item having a lower dollar value, with a projected theoretical count. The system can be configured to never have the lower value item physically counted, or to only periodically on a lower interval than higher value or variance items, such as monthly or yearly, have the item physically counted.

In some embodiments, an inventory system is configured to be a learning system that learns over time the most common errors, mistakes, loss values, use values, resource or employee productivity, and/or the like. For example, an inventory system as disclosed herein can be configured to learn over time which items typically have a higher variance and which items typically have a lower variance. The system can be configured to automatically adjust counting frequencies of items based on the values it learns. In some embodiments, the system can be configured to learn other things, such as which employees are most efficient, which employees most accurately count inventory, which suppliers provide the highest quality or lowest quality supplies, and/or the like. Such a learning system can be advantageous to, among other things, enable the inventory system to become more and more accurate over time. For example, the system can enable a business to more accurately over time determine its needs for inventory ordering such that over time the chance becomes lower and lower that a business will over or under order for any particular item. Accordingly, a learning system as disclosed herein can help a business to operate more efficiently and with lower overhead costs.

The inventory systems as disclosed herein require computer hardware to operate. Some of the methods and processes as disclosed herein cannot be performed without computer hardware. For example, in some embodiments, an inventory system is configured to enable a user to count inventory items using a mobile device, while the inventory system dynamically in real time updates a countdown indicator and/or visual status indicator based on real time sales or other usage data that is occurring while the user is conducting the inventory count. In some embodiments, a user may be utilizing a mobile device, such as a smartphone or table computer, to conduct the inventory count while a plurality of orders are simultaneously being processed that affect the projected current inventory level. For example, in some embodiments, a relatively large number of orders that may potentially affect an inventory count may be processed in a short amount of time while the inventory count is occurring. For example, during a 10 minute interval during which an inventory count is occurring, one or more order processing systems may be configured to process 10, 20, 50, 100, 1000, 10,000, or more orders that may affect the real time projected inventory level, thus affecting the countdown indicator of the mobile electronic device. Further, in some embodiments, the user access point system requires computer hardware to, among other things, update in real time the countdown indicator, visual status indicator, and/or the like based on real time projected inventory information.

Further, in some embodiments, an inventory system is configured to be able to enable a plurality of user access point systems to count inventory simultaneously. Accordingly, computer hardware is required in some embodiments to enable real-time tracking of each of the user access point systems to update inventory estimates in real time and/or to ensure multiple user access point systems are not being utilized to count the same items. For example, in some embodiments, an inventory system can be configured to, once one user access point system indicates to the inventory system that it will be used to count cheese in the freezer, to not allow any other user access point systems to simultaneously count cheese in the freezer. However, in some embodiments, the system can be configured to enable more than one user access point system to simultaneously count in the same storage location for the same item. In such an embodiment, computer hardware can also be required, such as to in real time update the countdown indicators of each of the user access point systems based on the counting of all of the user access point systems. For example, if two user access point systems are simultaneously being used to count cheese in the freezer, each count recorded by one of the user access point systems can be used to update the countdown indicator of the other user access point system in real time. These are merely a few examples of reasons why at least some of the embodiments disclosed herein cannot operate without the use of computer hardware.

Computing System

Figure 7:
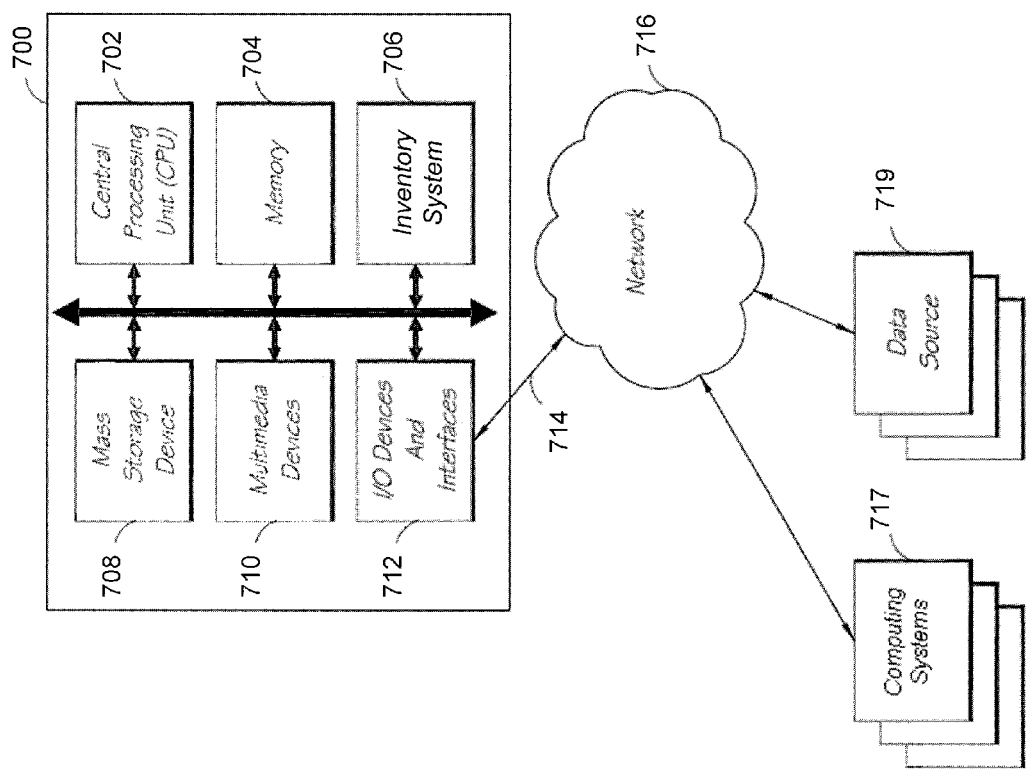
FIG. 7 is a block diagram depicting an embodiment of a computer hardware system configured to run software for implementing one or more embodiments of the inventory systems and other systems described herein.

FIG. 7 is a block diagram depicting an embodiment of a computer hardware system configured to run software for implementing one or more embodiments of the inventory systems described herein.

In some embodiments, the computer clients and/or servers described above take the form of a computing system 700 illustrated in FIG. 7 which is a block diagram of one embodiment of a computing system that is in communication with one or more computing systems 717 and/or one or more data sources 719 via one or more networks 716. The computing system 700 may be used to implement one or more of the systems and methods described herein. In addition, in one embodiment, the computing system 700 may be configured to manage access or administer a software application. While FIG. 7 illustrates one embodiment of a computing system 700, it is recognized that the functionality provided for in the components and modules of computing system 700 may be combined into fewer components and modules or further separated into additional components and modules.

Inventory System Module

In one embodiment, the computing system 700 comprises a inventory system module 706 that carries out the functions described herein with reference to tracking and estimating inventory, including any one of the techniques described above. The inventory system module 706 and/or other modules may be executed on the computing system 700 by a central processing unit 702 discussed further below.

In general, the word "module," as used herein, refers to logic embodied in hardware or firmware, or to a collection of software instructions, possibly having entry and exit points, written in a programming language, such as, for example, COBOL, CICS, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Computing System Components

In one embodiment, the computing system 700 also comprises a mainframe computer suitable for controlling and/or communicating with large databases, performing high volume transaction processing, and generating reports from large databases. The computing system 700 also comprises a central processing unit ("CPU") 702, which may comprise a conventional microprocessor. The computing system 700 further comprises a memory 704, such as random access memory ("RAM") for temporary storage of information and/or a read only memory ("ROM") for permanent storage of information, and a mass storage device 708, such as a hard drive, diskette, or optical media storage device. Typically, the modules of the computing system 700 are connected to the computer using a standards based bus system. In different embodiments, the standards based bus system could be Peripheral Component Interconnect (PCI), Microchannel, SCSI, Industrial Standard Architecture (ISA), and Extended ISA (EISA) architectures, for example.

The computing system 700 comprises one or more commonly available input/output (I/O) devices and interfaces 712, such as a keyboard, mouse, touchpad, and printer. In one embodiment, the I/O devices and interfaces 712 comprise one or more display devices, such as a monitor, that allows the visual presentation of data to a user. More particularly, a display device provides for the presentation of GUIs, application software data, and multimedia presentations, for example. In one or more embodiments, the I/O devices and interfaces 712 comprise a microphone and/or motion sensor that allow a user to generate input to the computing system 700 using sounds, voice, motion, gestures, or the like. In the embodiment of FIG. 7, the I/O devices and interfaces 712 also provide a communications interface to various external devices. The computing system 700 may also comprise one or more multimedia devices 710, such as speakers, video cards, graphics accelerators, and microphones, for example.

Computing System Device/Operating System

The computing system 700 may run on a variety of computing devices, such as, for example, a server, a Windows server, a Structure Query Language server, a Unix server, a personal computer, a mainframe computer, a laptop computer, a tablet computer, a cell phone, a smartphone, a personal digital assistant, a kiosk, an audio player, an e-reader device, and so forth. The computing system 700 is generally controlled and coordinated by operating system software, such as z/OS, Windows 95, Windows 98, Windows NT, Windows 2000, Windows XP, Windows Vista, Windows 7, Windows 8, Linux, BSD, SunOS, Solaris, Android, iOS, BlackBerry OS, or other compatible operating systems. In Macintosh systems, the operating system may be any available operating system, such as MAC OS X. In other embodiments, the computing system 700 may be controlled by a proprietary operating system. Conventional operating systems control and schedule computer processes for execution, perform memory management, provide file system, networking, and I/O services, and provide a user interface, such as a graphical user interface ("GUI"), among other things.

Network

In the embodiment of FIG. 7, the computing system 700 is coupled to a network 716, such as a LAN, WAN, or the Internet, for example, via a wired, wireless, or combination of wired and wireless, communication link 714. The network 716 communicates with various computing devices and/or other electronic devices via wired or wireless communication links. In the embodiment of FIG. 7, the network 716 is communicating with one or more computing systems 717 and/or one or more data sources 719.

Access to the inventory system module 706 of the computer system 700 by computing systems 717 and/or by data sources 719 may be through a web-enabled user access point such as the computing systems' 717 or data source's 719 personal computer, cellular phone, smartphone, laptop, tablet computer, e-reader device, audio player, or other device capable of connecting to the network 716. Such a device may have a browser module that is implemented as a module that uses text, graphics, audio, video, and other media to present data and to allow interaction with data via the network 716.

The browser module may be implemented as a combination of an all points addressable display such as a cathode-ray tube (CRT), a liquid crystal display (LCD), a plasma display, or other types and/or combinations of displays. In addition, the browser module may be implemented to communicate with input devices 712 and may also comprise software with the appropriate interfaces which allow a user to access data through the use of stylized screen elements such as, for example, menus, windows, dialog boxes, toolbars, and controls (for example, radio buttons, check boxes, sliding scales, and so forth). Furthermore, the browser module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition a touch screen may act as a hybrid input/output device. In another embodiment, a user may interact with the system more directly such as through a system terminal connected to the score generator without communications over the Internet, a WAN, or LAN, or similar network.

In some embodiments, the system 700 may comprise a physical or logical connection established between a remote microprocessor and a mainframe host computer for the express purpose of uploading, downloading, or viewing interactive data and databases online in real time. The remote microprocessor may be operated by an entity operating the computer system 700, including the client server systems or the main server system, an/or may be operated by one or more of the data sources 719 and/or one or more of the computing systems 717. In some embodiments, terminal emulation software may be used on the microprocessor for participating in the micro-mainframe link.

In some embodiments, computing systems 717 who are internal to an entity operating the computer system 700 may access the inventory system module 706 internally as an application or process run by the CPU 702.

User Access Point

In an embodiment, a user access point or user interface comprises a personal computer, a laptop computer, a tablet computer, an e-reader device, a cellular phone, a smartphone, a GPS system, a Blackberry® device, a portable computing device, a server, a computer workstation, a local area network of individual computers, an interactive kiosk, a personal digital assistant, an interactive wireless communications device, a handheld computer, an embedded computing device, an audio player, or the like.

Other Systems

In addition to the systems that are illustrated in FIG. 7, the network 716 may communicate with other data sources or other computing devices. The computing system 700 may also comprise one or more internal and/or external data sources. In some embodiments, one or more of the data repositories and the data sources may be implemented using a relational database, such as DB2, Sybase, Oracle, CodeBase and Microsoft® SQL Server as well as other types of databases such as, for example, a flat file database, an entity-relationship database, and object-oriented database, and/or a record-based database.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims. Determining inventory for hundreds or thousands or tens of thousands or millions of inventory items across one facility or hundreds or thousands of facilities can be challenging because the inventory status of each inventory item at each facility is continuously changing. Therefore, in an embodiment, the systems disclosed herein require continuous updated information regarding the inventory status of each inventory item at each facility. As the information about the status of the various inventory items at a facility changes, the system can be configured to adapt accordingly in real-time. Another challenge of the system is the managing, processing, analyzing, and logging of the large amount of data transmitted for each inventory item from each facility. In an embodiment, the system can be configured to receive inventory data from each facility once every 1 second to 5 seconds. The sheer volume of data coming into the system makes it impossible for a human being, whether entirely in the person's mind or whether the person is using a pen and paper, to track and/or perform, in real-time or substantially real-time, the activities of the embodiments of the systems that are disclosed herein.

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods can be carried out using any appropriate apparatus. Further, the disclosure herein of any particular feature, aspect, method, property, characteristic, quality, attribute, element, or the like in connection with an embodiment can be used in all other embodiments set forth herein. For all of the embodiments described herein the steps of the methods need not be performed sequentially. Thus, it is intended that the scope of the present invention herein disclosed should not be limited by the particular disclosed embodiments described above.

What is claimed is:

1. A real-time inventory system for robust tracking of inventory of a plurality of items, the inventory system comprising:

an electronic inventory database configured to store data relating to the plurality of items, the data comprising at least a first count frequency associated with a first item, a plurality of storage locations at which the first item may be stored, an estimated quantity of the first item currently stored in each of the plurality of storage locations, at least one applicable unit of storage for each of the plurality of storage locations, and a second count frequency associated with a second item, wherein the second count frequency is different than the first count frequency;

a point of sale system configured to receive and process orders, the point of sale system comprising:

an electronic display for inputting and viewing order information;
an electronic credit card reader configured to obtain payment data from credit cards; and
a network interface configured to transmit the payment data to a payment processing system to enable completion of orders;

a projection engine configured to calculate in real-time the estimated quantity of the first item currently stored in each of the plurality of storage locations based at least in part on sales data received from the point of sale system;

a prioritization engine configured to analyze the first count frequency and a last count time for the first item to determine that the first item should be counted;

the prioritization engine further configured to analyze the second count frequency and a last count time for the second item to determine that the second item should not be counted;

a counting interface configured to electronically communicate with a user access point system through a computer network to transmit counting instruction data and to receive current count data and current storage location data, the counting instruction data configured to cause the user access point system to dynamically enable inputting of count data in only the at least one applicable unit of storage for a current storage location indicated by the current storage location data, the current count data indicating a current actual quantity of the first item in a first storage location;

a variance calculator configured to access the estimated quantity of the first item currently stored in the first storage location, and to determine a first variance value based on comparing the current count data to the estimated quantity;

an error detector configured to analyze the first variance value and to, automatically based on determining the variance exceeds a threshold value, transmit data to the user access point system to cause the first item to be recounted and enable input of a recount value based on recounting the first item;

the variance calculator further configured to determine a second variance value based on comparing the recount value to the estimated quantity, a count frequency controller configured to automatically increase the first count frequency based on determining the second variance value is above a threshold level to cause the first item to be counted with increased frequency, the count frequency controller configured to automatically decrease the first count frequency based on determining the second variance level is at or below the threshold level to cause the first item to be counted with decreased frequency; and one or more computers configured to operate the prioritization engine, counting interface, variance calculator, and error detector, wherein the one or more computers comprises a computer processor and an electronic storage medium.

2. The inventory system of claim 1, wherein the counting interface is further configured to transmit to the user access point system the estimated quantity of the first item currently stored in the first storage location, enabling the user access point system to indicate using an electronic display an estimated quantity remaining to be counted.

3. The inventory system of claim 1, wherein the counting interface is further configured to transmit to the user access point system a second threshold value, enabling the user access point system to indicate, using a pictorial indicator of an electronic display, whether the estimated quantity remaining to be counted is within the second threshold value.

4. The inventory system of claim 1, wherein the user access point system and the real-time inventory system operate on the same one or more computers.

5. The inventory system of claim 1,
wherein the projection engine calculating in real-time the estimated quantity comprises adjusting a last physical count quantity for theoretical usage and anticipated loss, wherein the theoretical usage is determined at least in part based on the sales data received from the point of sale system.

6. The inventory system of claim 1, wherein the variance calculator is configured to operate in real-time to update the variance based on updated current count data received from the user access point system and the sales data received from the point of sale system.

* * * * *

UNITED STATES PATENT AND TRADEMARK OFFICE
CERTIFICATE OF CORRECTION

| | |
|---|---|
| PATENT NO. | : 8,965,796 B1 |
| APPLICATION NO. | : 14/257819 |
| DATED | : February 24, 2015 |
| INVENTOR(S) | : Mitesh Gala |

Page 1 of 1

It is certified that error appears in the above-identified patent and that said Letters Patent is hereby corrected as shown below:

In the Specification

In column 23 at line 62, Change "bloc k" to --block--.

In column 29 at line 35, Change "an/or" to --and/or--.

In the Claims

In column 32 at line 22 (approx.), In Claim 3, change "claim 1," to --claim 2,--.

In column 32 at line 37 (approx.), In Claim 6, change "claim 1," to --claim 5,--.

Signed and Sealed this
Nineteenth Day of January, 2016

Michelle K. Lee
*Director of the United States Patent and Trademark Office*